US012308594B2

(12) United States Patent
Perry et al.

(10) Patent No.: US 12,308,594 B2
(45) Date of Patent: May 20, 2025

(54) ULTRA-LOW PROFILE COAXIAL CABLE CONNECTOR

(71) Applicant: Intel Corporation, Santa Clara, CA (US)

(72) Inventors: Richard Perry, Portland, OR (US); Robert Schum, Roseburg, OR (US)

(73) Assignee: Intel Corporation, Santa Clara, CA (US)

(*) Notice: Subject to any disclaimer, the term of this patent is extended or adjusted under 35 U.S.C. 154(b) by 734 days.

(21) Appl. No.: 17/474,470

(22) Filed: Sep. 14, 2021

(65) Prior Publication Data

US 2023/0092528 A1 Mar. 23, 2023

(51) Int. Cl.
*H01R 9/05* (2006.01)

(52) U.S. Cl.
CPC ......... *H01R 9/0515* (2013.01); *H01R 9/0503* (2013.01); *H01R 9/0524* (2013.01)

(58) Field of Classification Search
CPC .. H01R 9/0515; H01R 9/0503; H01R 9/0524; H01R 12/57; H01R 24/50; H01R 2201/02; H01R 9/0518
See application file for complete search history.

(56) References Cited

U.S. PATENT DOCUMENTS

| | | | | |
|---|---|---|---|---|
| 5,772,470 | A * | 6/1998 | Togashi | H01R 9/0518 439/582 |
| 6,361,348 | B1 | 3/2002 | Hall et al. | |
| 6,676,445 | B2 | 1/2004 | Hall et al. | |
| 6,971,913 | B1 | 12/2005 | Chu | |
| 7,042,318 | B2 | 5/2006 | Barnes et al. | |
| 7,351,067 | B2 | 4/2008 | Chen et al. | |
| 7,367,811 | B2 * | 5/2008 | Nagata | H01R 24/50 439/63 |
| 7,540,774 | B1 * | 6/2009 | Hung | H01R 24/40 439/582 |
| 7,704,096 | B2 | 4/2010 | Liao et al. | |
| 7,819,680 | B2 | 10/2010 | Hoyack et al. | |
| 7,845,978 | B1 | 12/2010 | Chen | |
| 8,172,613 | B1 | 5/2012 | Chen et al. | |
| 8,512,073 | B2 * | 8/2013 | Takano | H01R 13/631 439/582 |
| 8,911,240 | B2 | 12/2014 | Biddle et al. | |

(Continued)

FOREIGN PATENT DOCUMENTS

CN 201078823 Y 6/2008

*Primary Examiner* — Travis S Chambers
(74) *Attorney, Agent, or Firm* — Banner & Witcoff Ltd.

(57) ABSTRACT

An ultra-low profile coaxial cable connector (i.e. plug) is provided that implements a lateral coupling of a coaxial cable inner conductor and center pin of a mating PCB-mounted coaxial receptacle. The overall height of a mating coaxial receptacle center pin is also reduced by way of a cutout in the receptacle ground ring as well as a cutout in a mating outer shell of the coaxial cable connector. The ultra-low profile coaxial cable connector achieves a reduction in mated height of less than 1.0 mm for both 1.13 mm diameter and 0.81 mm diameter coaxial cables. In both cases, the coaxial cable connector designs as discussed herein enable a further reduction in the total thickness of communication module boards to 1.25 mm, thereby meeting the high demands for thinner electronic device designs.

22 Claims, 17 Drawing Sheets

100

(56) References Cited

U.S. PATENT DOCUMENTS

| | | | | |
|---|---|---|---|---|
| 9,172,195 | B2 | 10/2015 | Chen et al. | |
| 9,570,820 | B2 * | 2/2017 | Guo | H01R 9/0518 |
| 2005/0277317 | A1 | 12/2005 | Peng | |
| 2013/0040481 | A1 | 2/2013 | Vallely et al. | |

* cited by examiner

100

100

100

100

201

102

102

104

106

700

ULTRA-LOW PROFILE COAXIAL CABLE CONNECTOR

TECHNICAL FIELD

The disclosure described herein generally relates to coaxial cable connectors and, in particular, to ultra-low profile coaxial cable connectors.

BACKGROUND

Coaxial cables are generally known, and which include transmission lines comprising at least one electrically conducting material, preferably in a tubal form that may function as one or more outer conductors, which surround and are separated from a central or inner conductor by one or more insulating elements. Common types of coaxial cables include micro coaxial cables, as well as RG6, RG11, and RG59 coaxial cables, each of which typically have a characteristic impedance of 50 or 75 Ohms. Coaxial cables thus function to couple radio frequency (RF) signals between an antenna and other RF components. Coaxial cables are used in various products to couple transceivers to an antenna and to enable data communications. Such products may include portable electronics devices that implement communication modules that are coupled to one or more antennas via a coaxial cable to enable various types of communications, such as Wi-Fi and/or cellular data communications.

Coaxial cables for such applications are typically fitted with a connecting element such as electrically conducting metal connector at both ends, with one end being coupled to the antenna and the other end being coupled to an RF component, which may include the aforementioned communication module. Thus, the communication module may have a mating coaxial receptacle for this purpose, which is often board-mounted (i.e. a printed circuit board (PCB) mount design). The coaxial cable connector is typically mounted to the mating coaxial receptacle via a 90-degree coaxial cable connector design to reduce the minimum height needed for installing the communication module in a particular device. For Wi-Fi communication modules, conventional regulatory-certified Wi-Fi module designs that implement on-board RF connectors have an overall thickness of 1.8 mm. However, current marketing trends for mobile devices such as tablets and thin and light personal computers (PCs) are driving a further reduction in the height dimension of communication module design.

BRIEF DESCRIPTION OF THE DRAWINGS/FIGURES

The accompanying drawings, which are incorporated herein and form a part of the specification, illustrate the present disclosure and, together with the description, further serve to explain the principles and to enable a person skilled in the pertinent art to make and use the techniques discussed herein.

In the drawings, like reference characters generally refer to the same parts throughout the different views. The drawings are not necessarily to scale, emphasis instead generally being placed upon illustrating the principles of the disclosure. In the following description, reference is made to the following drawings, in which.

The present disclosure will be described with reference to the accompanying drawings. The drawing in which an element first appears is typically indicated by the leftmost digit(s) in the corresponding reference number.

DETAILED DESCRIPTION

Figure 1A:
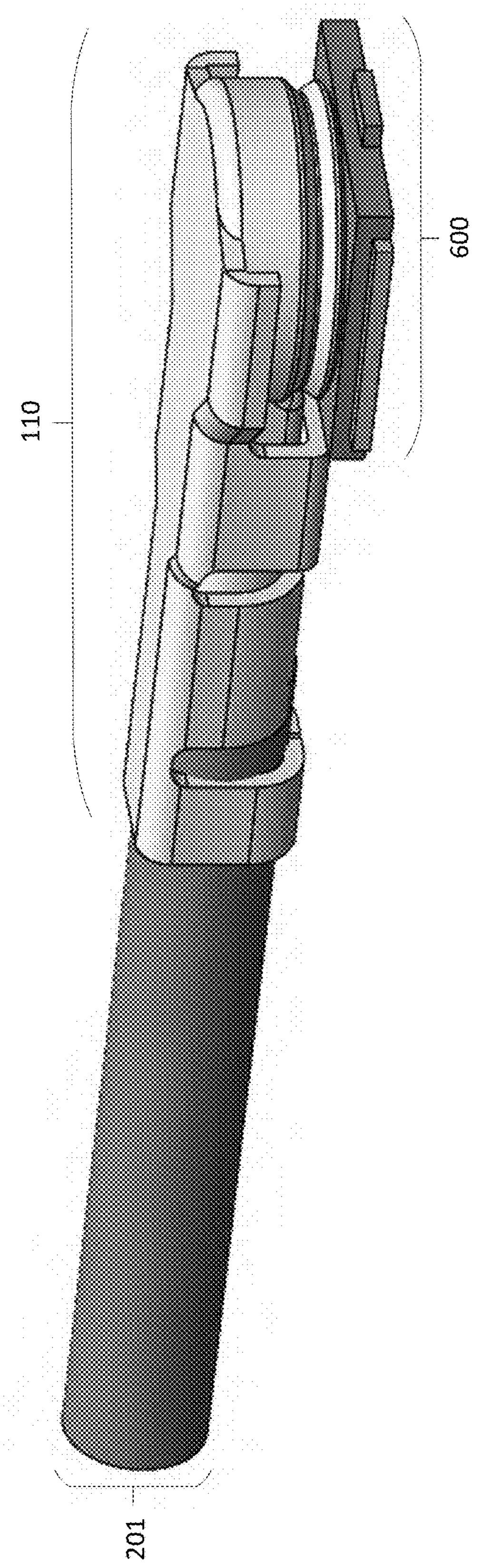
FIGS. 1A-1G illustrate various views of an exemplary coaxial cable connector, in accordance with the disclosure.

The following detailed description refers to the accompanying drawings that show, by way of illustration, exemplary details in which the disclosure may be practiced. In the following description, numerous specific details are set forth in order to provide a thorough understanding of the present disclosure. However, it will be apparent to those skilled in the art that the various designs, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring the disclosure.

As discussed further herein, communication modules include a board (i.e. a PCB) and communication components, which are soldered or otherwise mounted to the PCB. The communication module also typically includes a metallic shield mounted over the communication components. Furthermore, the communication module includes the aforementioned PCB-mounted RF connector, which is alternatively referred to herein as a coaxial receptacle or a receptacle. The coaxial receptacle is configured to mate with a corresponding coaxial cable connector fitted onto the coaxial cable, which is alternatively referred to herein as a plug. The plug mates with the coaxial receptacle to couple the coaxial cable inner and outer conductors to the communication module, and thus to ensure that the appropriate communication signals are transferred between the communication module and the coupled antenna or other RF component.

The communication module is identified with an overall profile or height that needs to be accommodated for its use in a particular electronic device. For conventional communication modules, this height is limited by the mated height of the coaxial cable plug and the coaxial receptacle.

Again, and as noted above, current marketing trends are driving a reduction in communication module height to facilitate thinner electronic devices. Previous solutions to reduce the communication module height (also referred to herein as profile or thickness) includes the use of smaller diameter coaxial cables, as the current coaxial cables used throughout the mobile electronics industry include both 1.13 mm and 0.81 mm diameter specifications. For 1.13 mm diameter coaxial cables, conventional coaxial cable connectors and receptacles have a mated height of 1.4 mm. For 0.81 mm coaxial cables, conventional coaxial cable plugs and receptacles have a reduced mated height of 1.2 mm. However, the use of 0.81 mm diameter coaxial cable solutions is not preferred, as such coaxial cables have a larger insertion loss (up to 2-3 dB) compared with 1.13 mm diameter coaxial cables. Furthermore, even the reduced mated height of 1.2 mm may be insufficient to meet present demands with respect to the overall module height, as additional clearance and tolerances are considered when mounting communication modules in electronic devices.

Therefore, the designs described herein address these issues by providing an ultra-low profile coaxial cable connector (i.e. plug) that facilitates a side or lateral coupling of the coaxial cable inner conductor and the center pin of an accompanying PCB-mounted coaxial receptacle. This is achieved by implementing a coaxial receptacle that sacrifices rotation of the coaxial cable connector when mated with the accompanying coaxial receptacle, as it is recognized that many applications do not require this rotation. The coaxial cable connector and coaxial receptacle designs implemented herein achieve a reduction in the mated height of the coaxial cable plug and receptacle to less than 1.0 mm for both 1.13 mm and 0.81 mm diameter coaxial cables. In both cases, the designs as discussed herein enable a further reduction in the total height of communication modules to 1.25 mm, thereby meeting the high demands for thinner electronic device designs.

FIGS. 1A-1G illustrate various views of a coaxial cable connector, in accordance with the disclosure. A coaxial cable 201 is shown including four different components: an outer jacket 201.1, an outer conductor 201.2, an insulator or dielectric core 201.3, and an inner conductor 201.4. The coaxial cable 201 is shown in further detail in FIG. 2A for a 1.13 mm diameter coaxial cable in a non-limiting sense, and in FIG. 2B for a 0.81 diameter coaxial cable in a non-limiting sense. That is, although shown in FIGS. 2A-2B as a 1.13 mm diameter coaxial cable and a 0.81 mm coaxial cable, respectively, the coaxial cable 201 may be identified with any suitable type of coaxial cable having any suitable diameter, number of layers, conductors, etc., with the four layers shown and discussed herein in a non-limiting manner. Moreover, the coaxial cable 201 may be identified with a coaxial cable used for RF communication applications as discussed herein, which may include "micro" coaxial cables and have an outer diameter specification of 1.13 mm (as shown in FIG. 2A), 0.81 mm (as shown in FIG. 2B), or any other suitable diameter that may be measured with respect to the outer jacket 201.1.

Figure 3A:
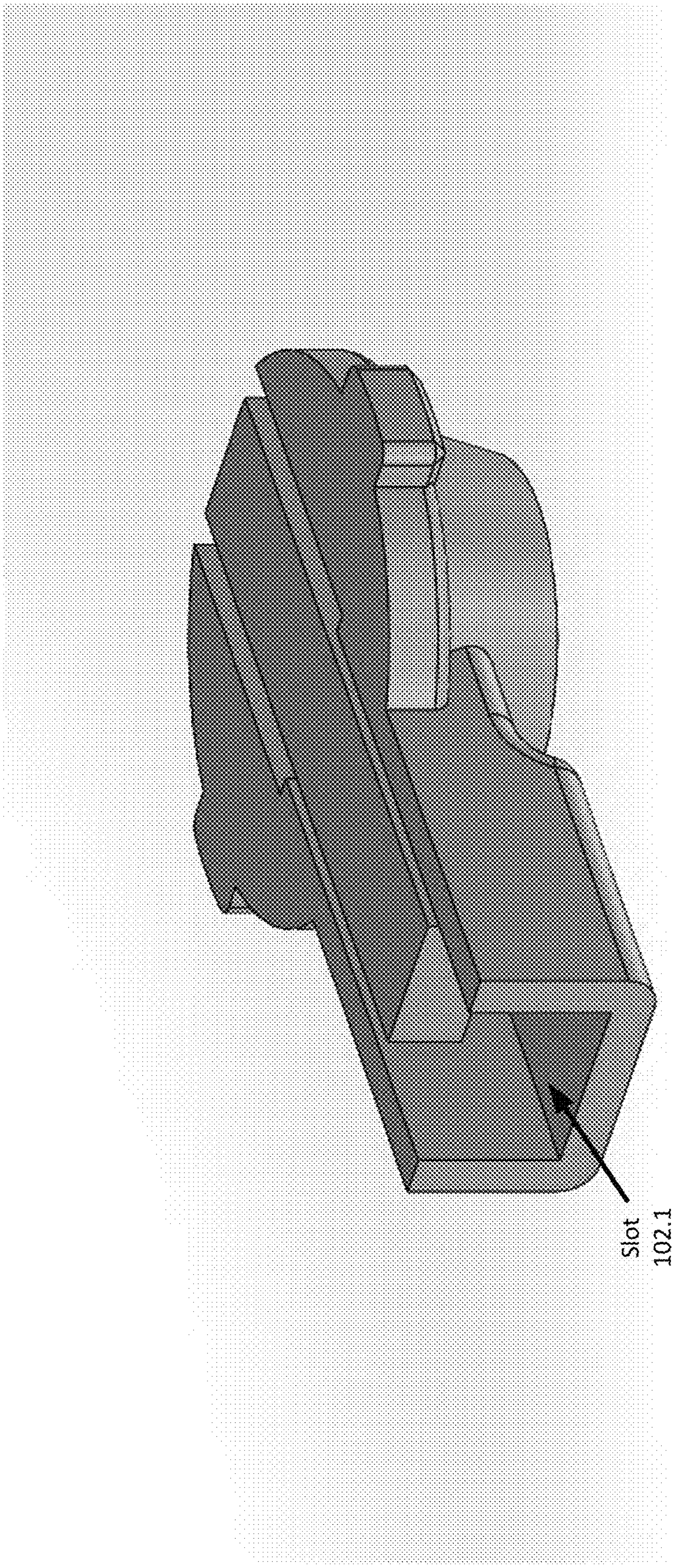
FIGS. 3A-3B illustrate a detailed view of an electrically-insulating insert that forms part of the coaxial cable connector as shown in FIGS. 1A-1G, in accordance with the disclosure.
Figure 3B:
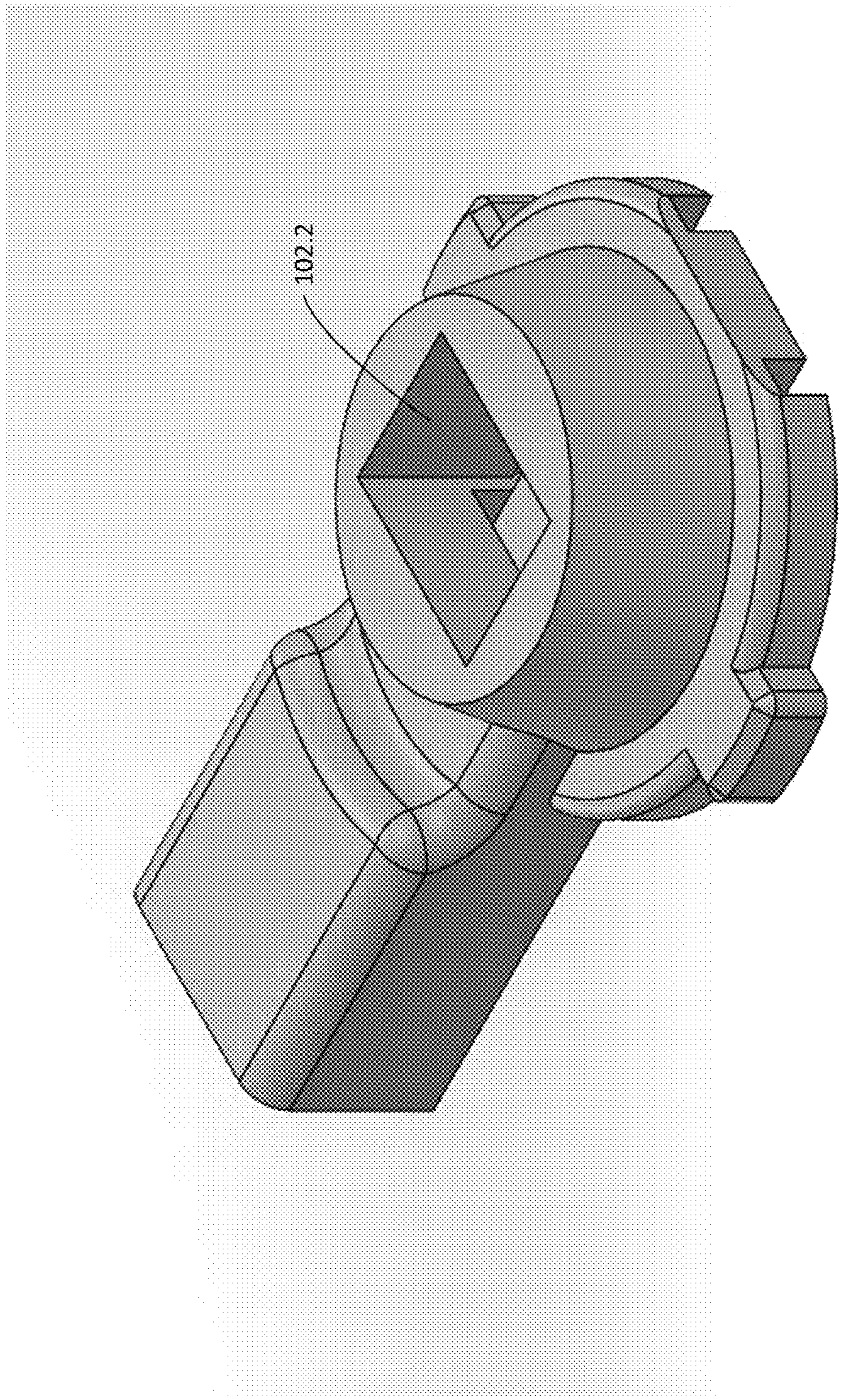
Figure 4:
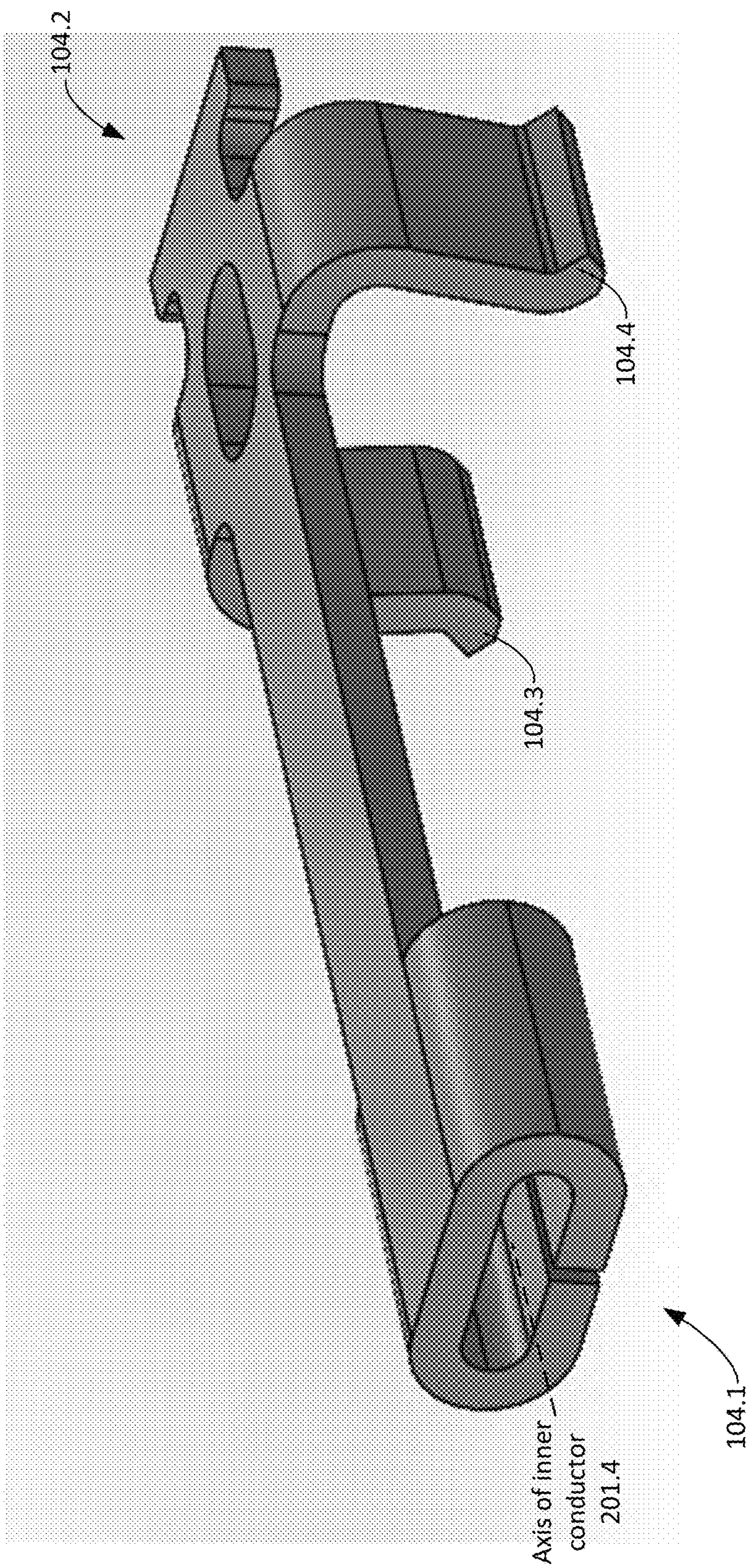
FIG. 4 illustrates a detailed view of a clamp that forms part of the coaxial cable connector as shown in FIGS. 1A-1G, in accordance with the disclosure.
Figure 5A:
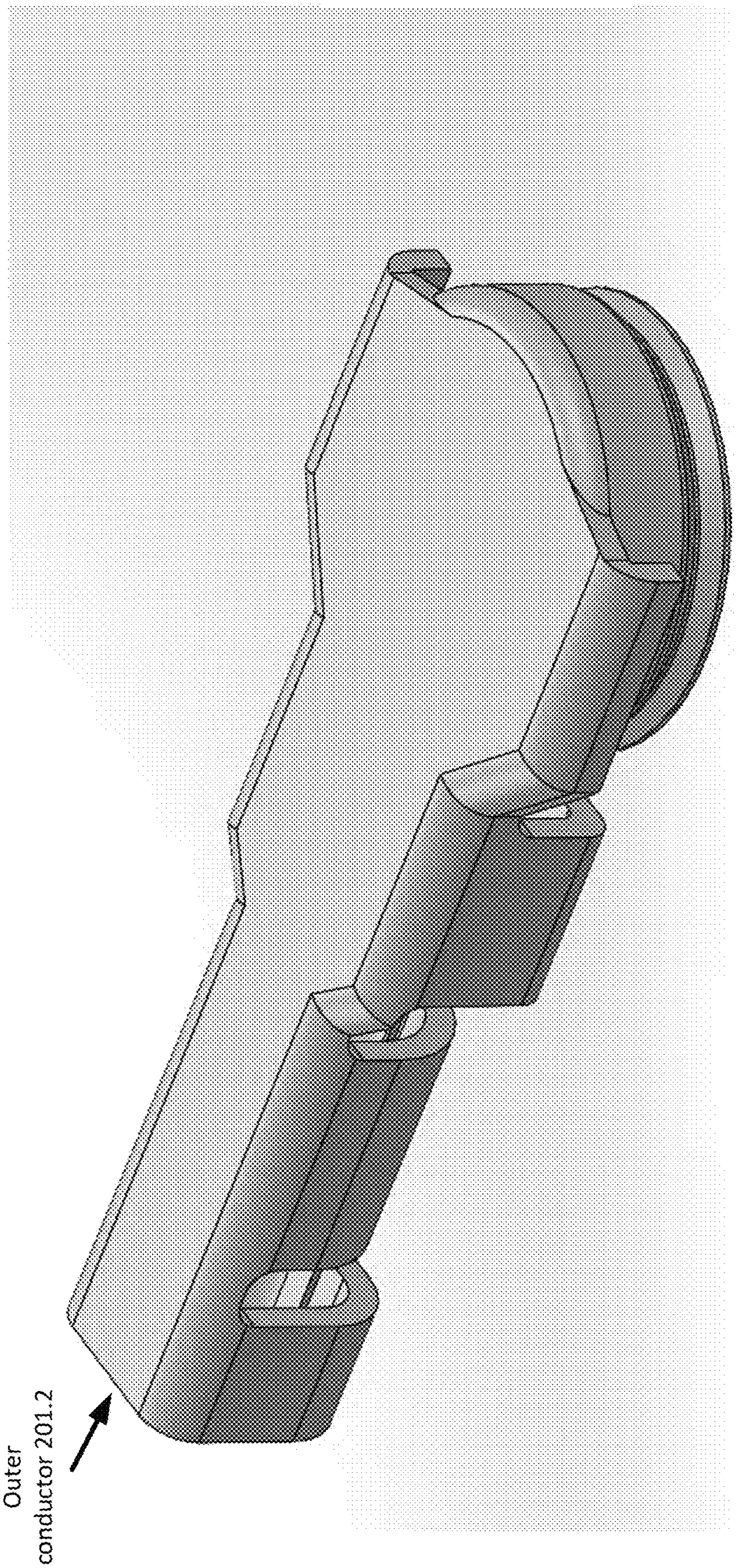
FIGS. 5A-5B illustrate a detailed view of an outer metal shell that forms part of the coaxial cable connector as shown in FIGS. 1A-1G, in accordance with the disclosure.
Figure 5B:
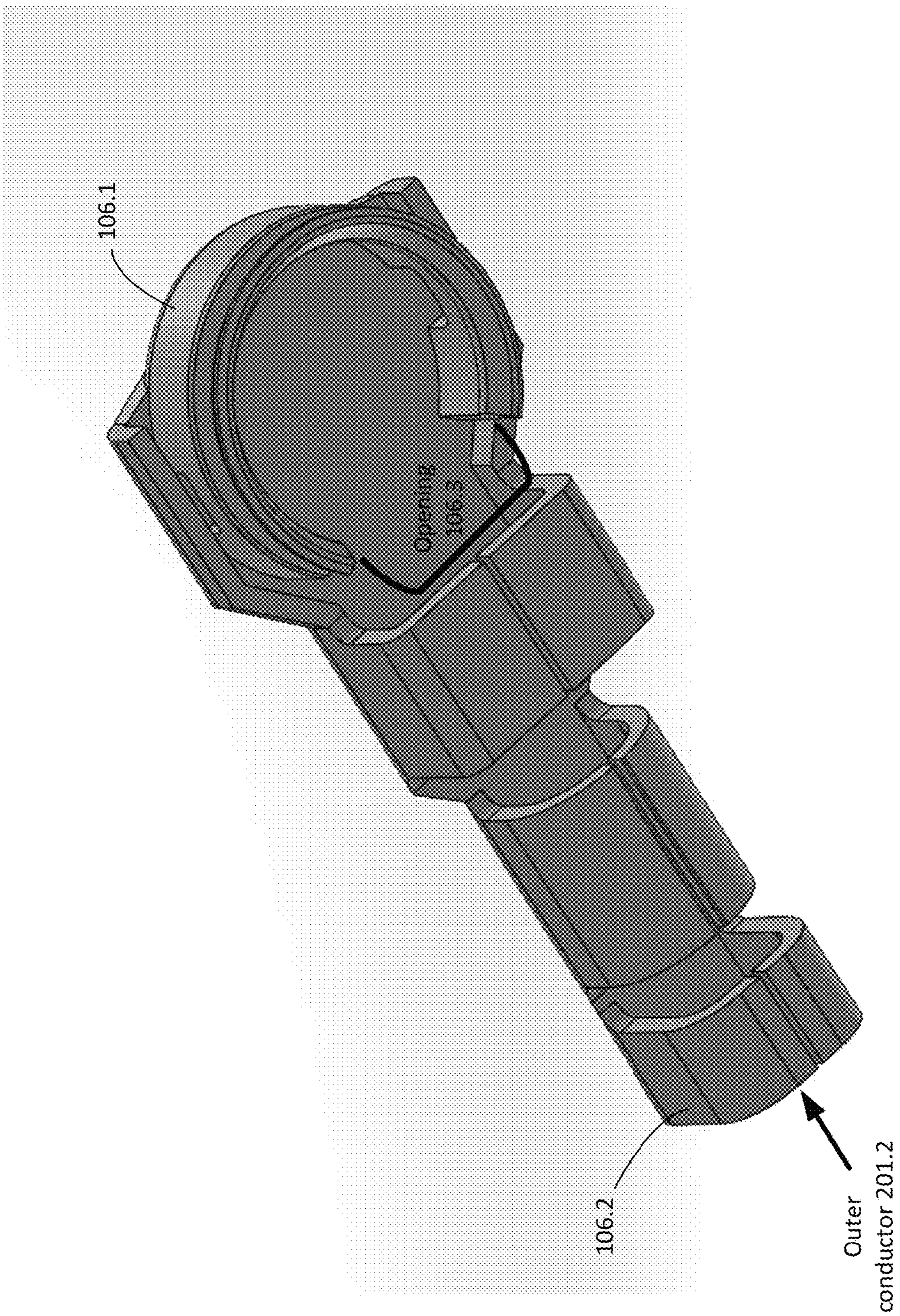
Figure 6B:
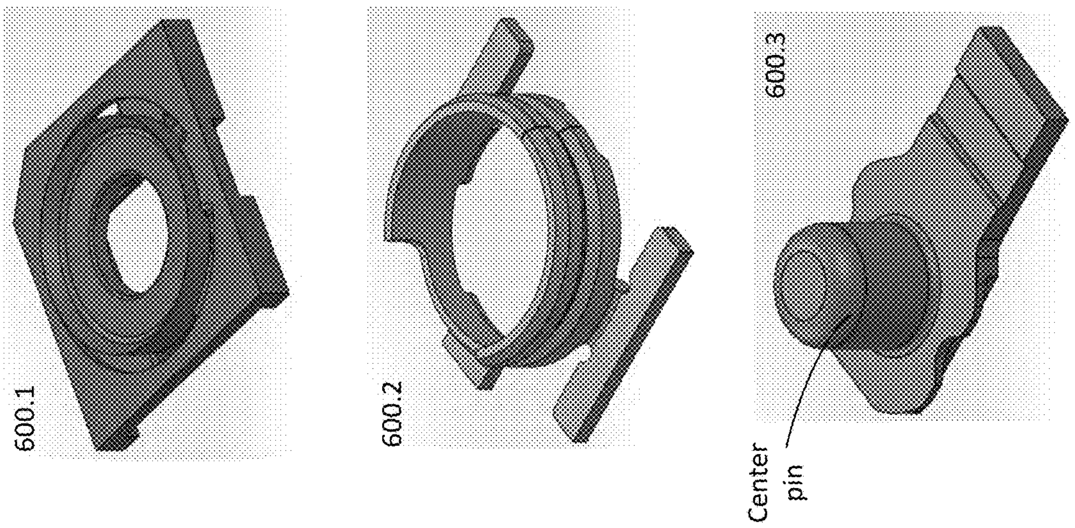
FIG. 6B illustrates details of the substrate, ground terminal, and center pin terminal of the coaxial receptacle as shown in FIG. 6A, in accordance with the disclosure.
Figure 6A:
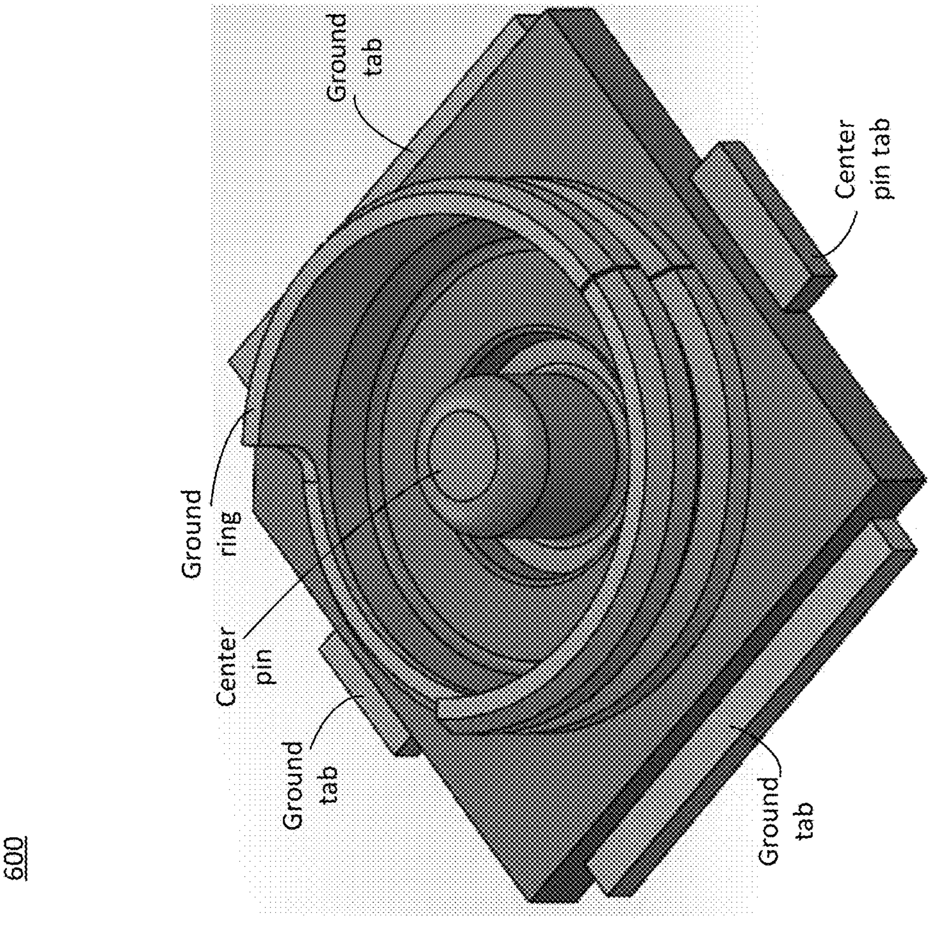
FIG. 6A illustrates a view of a coaxial receptacle that mates with the coaxial cable connector as shown in FIGS. 1A-1G, in accordance with the disclosure.

The coaxial cable connector 110 may be comprised as any suitable combination of conductive and non-conductive components to facilitate a connection of any suitable type of coaxial cable to a mating receptacle. The cable connector 110 may be implemented as a plug or plug assembly as discussed herein, and may include an insert 102, a clamp 104, and an outer shell 106. The coaxial cable connector 110 as assembled in this manner mates with a coaxial receptacle 600, which includes a substrate or spacer 600.1, a ground terminal 600.2, and a center pin terminal 600.3 as shown in FIGS. 1A-1G. The coaxial cable connector 110 in combination with the mated coaxial receptacle 600 as discussed herein form what is referred to as a low profile Radio Frequency Coaxial Connector (LPRFCC). Additional details regarding the insert 102 are shown in FIGS. 3A-3B. Additional details of the clamp 104 are shown in FIG. 4. Additional details of the outer shell 106 are shown in FIGS. 5A-5B. Additional details of the coaxial receptacle 600 are shown in FIGS. 6A-6B, which are further referenced herein for additional clarity.

Figure 1B:
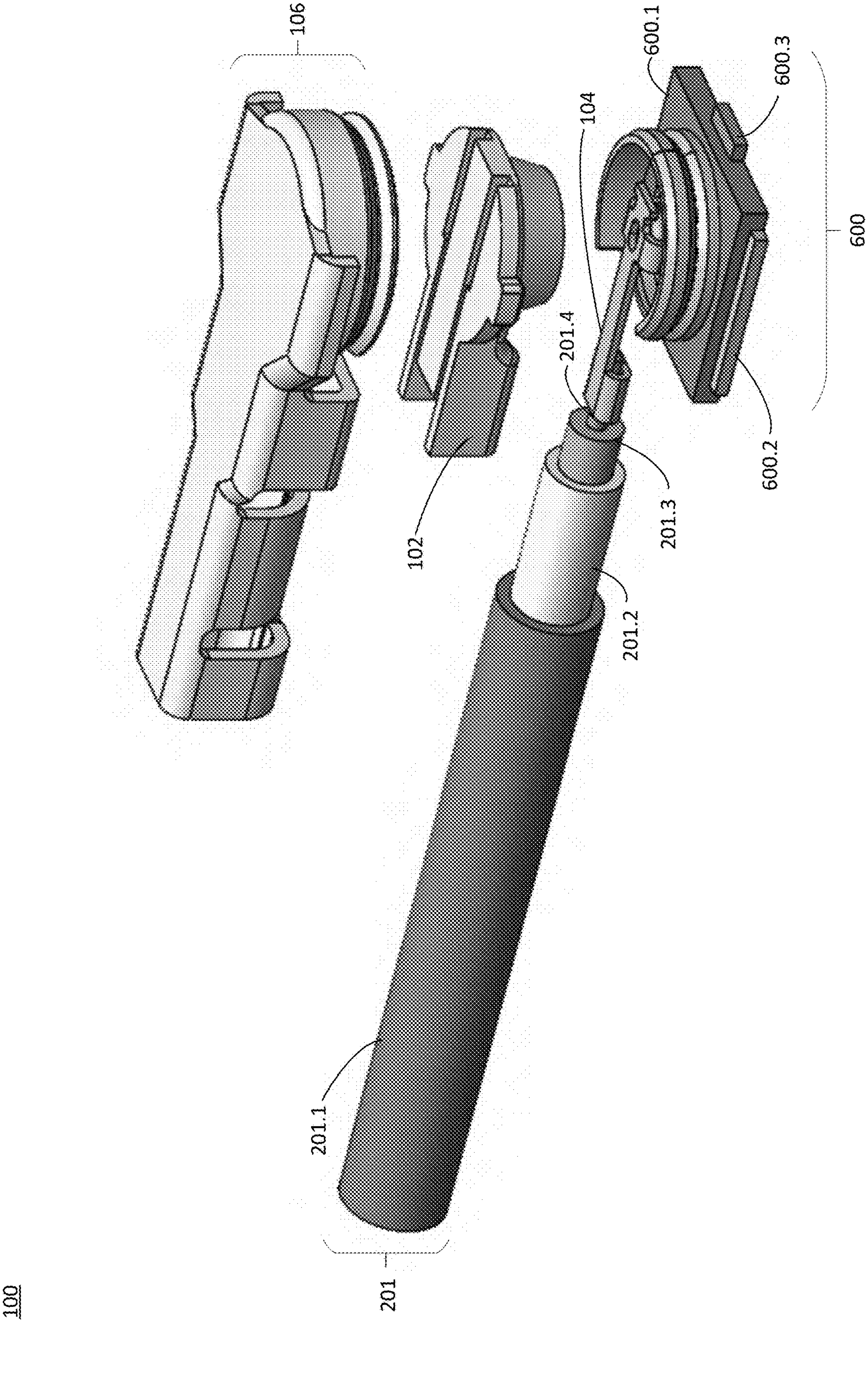
Figure 1C:
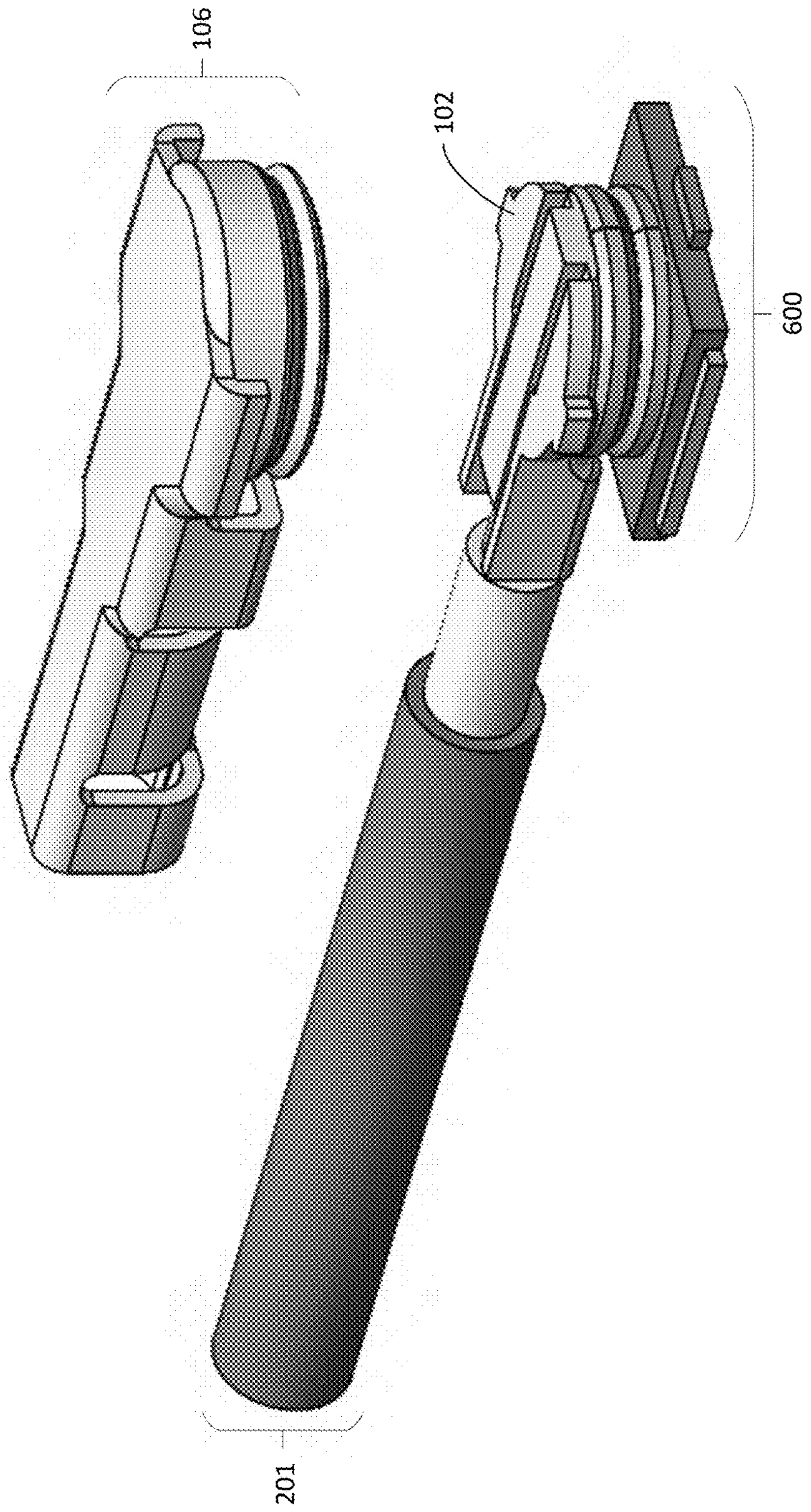
Figure 1D:
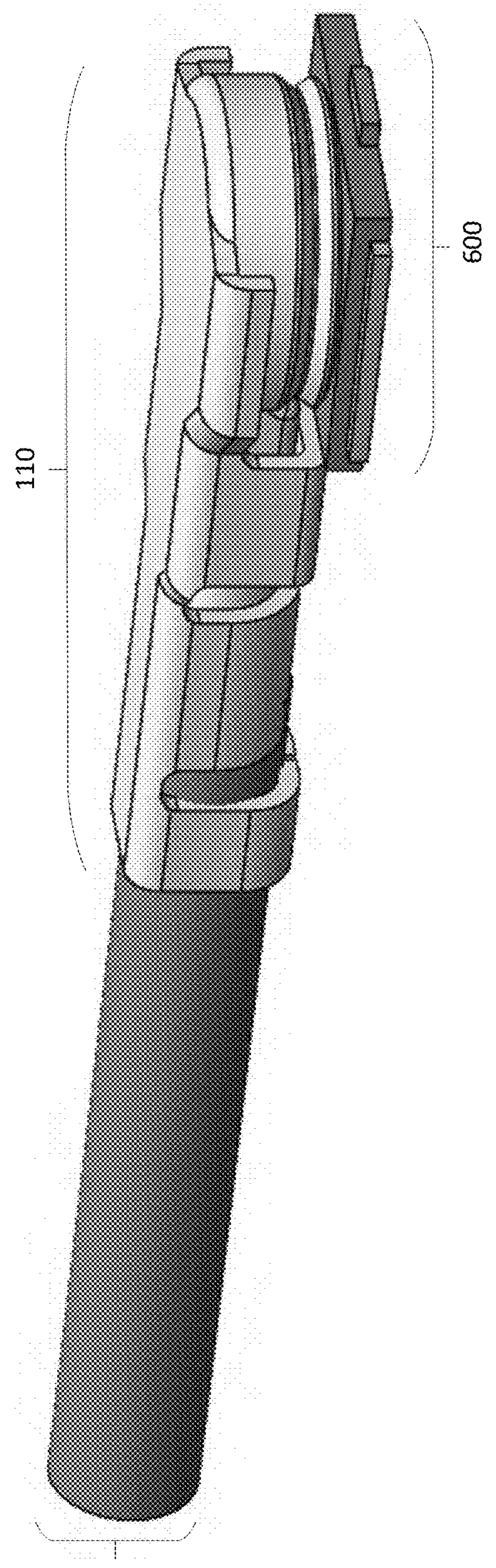
Figure 1E:
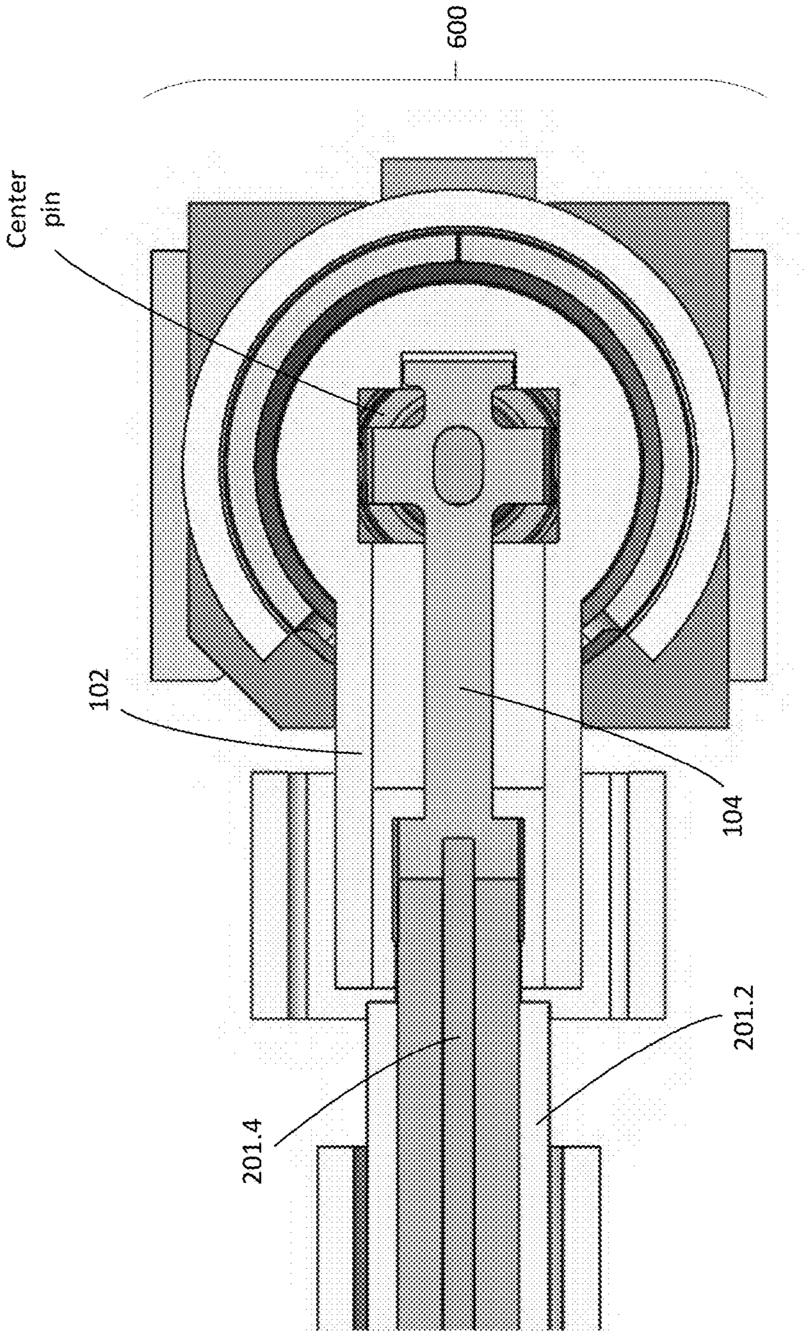
Figure 1F:
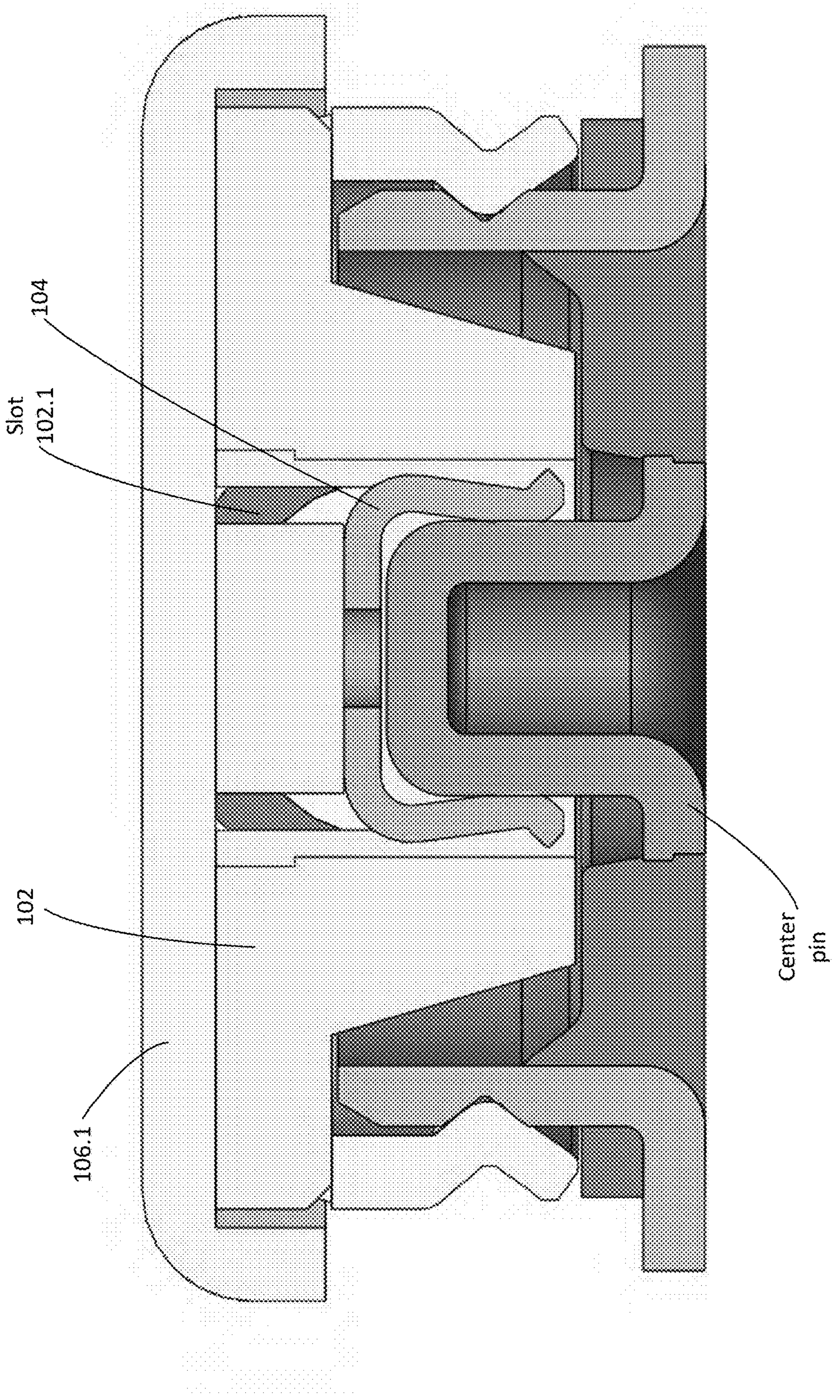
Figure 1G:
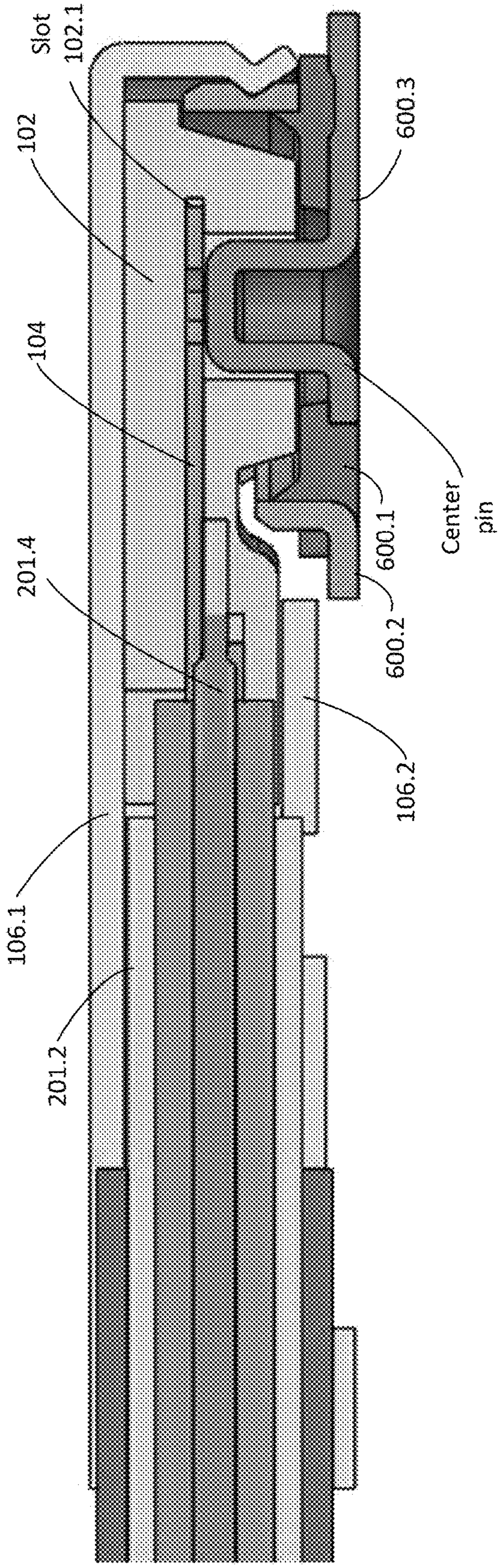
Figure 2A:
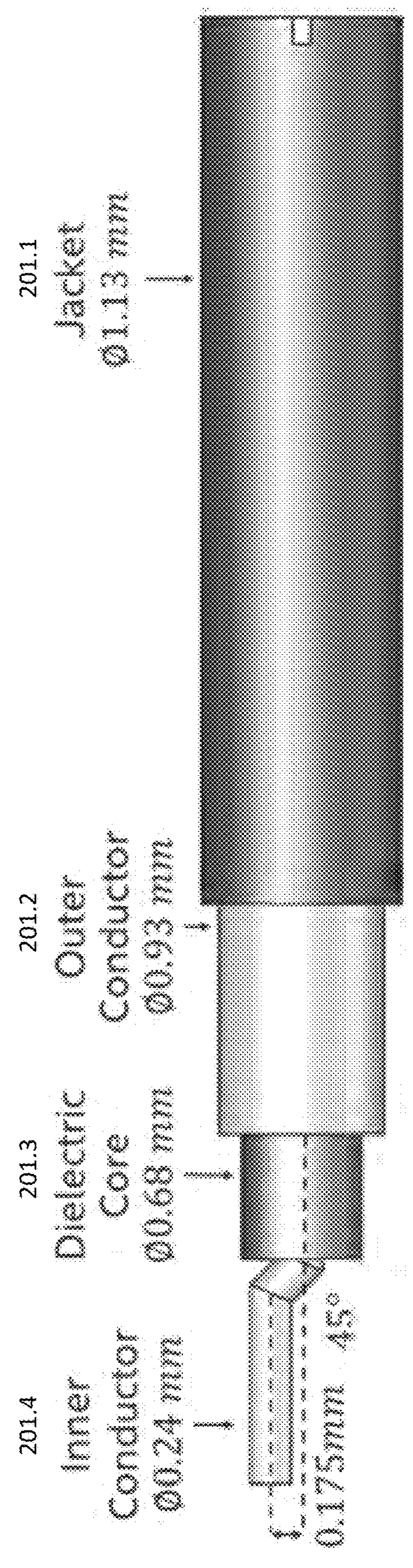
FIGS. 2A-2B illustrate a detailed view of coaxial cables that are compatible with the coaxial cable connector as shown in FIGS. 1A-1G, in accordance with the disclosure.
Figure 2B:
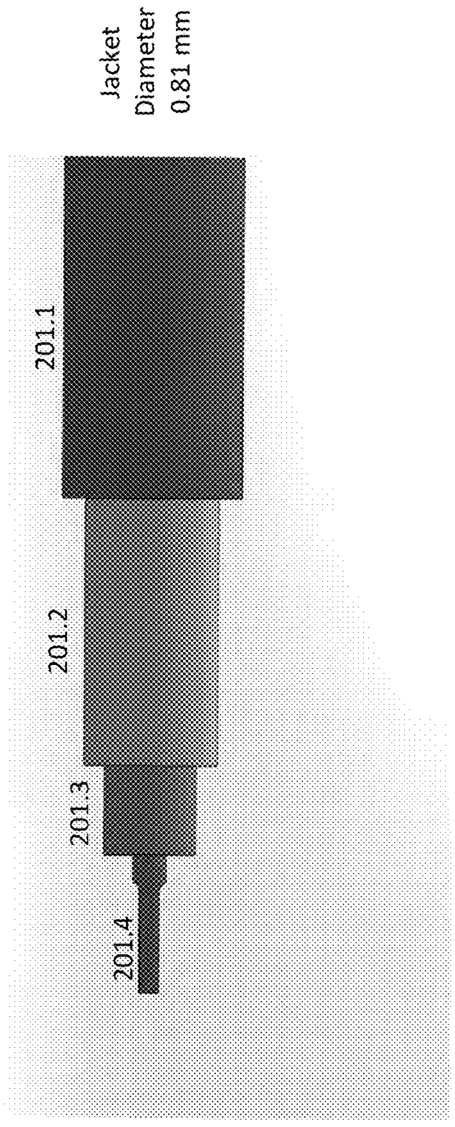

With continued reference to FIGS. 1A-1G, the insert 102 may be comprised of any suitable type of electrically-insulating material such as plastic or suitable polymer, a dielectric material, etc. The insert 102 is configured to fit into the outer shell 106 and the coaxial receptacle 600. As shown in further detail in FIG. 3A, the insert 102 has a slot, notch, recess, or trench 102.1 that is configured to receive and captivate (i.e. retain) the clamp 104 in place, which is illustrated in the views as shown in FIGS. 1F-1G. Thus, the slot 102.1 may be U-shaped as shown in FIG. 3A to ensure that the clamp 104 may fit within the slot 102.1. Thus, when the coaxial connector 110 is assembled, the clamp 104 fits into the slot 102.1 and is recessed therein such that the clamp 104 does not contact the outer shell 106 to avoid shorting to one another, as the clamp 104 and the outer shell 106 may both be comprised of an electrically-conductive material as noted herein.

Additional detail regarding the insert 102 is shown in FIGS. 3A-3B, which illustrate the slot 102.1 and a hole or opening 102.2. The hole 102.2 is configured to receive the center pin identified with the center pin terminal 600.3 of the coaxial receptacle 600 when the insert 102 is disposed in the outer metal shell 106, i.e. when the coaxial cable connector 110 is mated with the coaxial receptacle 600. Although shown in FIGS. 3A-3B as a rectangular-sized opening, the hole 102.2 may be any suitable size and/or shape to accommodate the diameter of the center pin of the center pin terminal 600.3.

Again, the slot 102.1 in the insert 102 is configured to receive the clamp 104. The clamp 104 is shown in further detail in FIG. 4, and is comprised of a single piece of metal or other suitable electrically-conductive material. The clamp 104 has a first end 104.1 and a second end 104.2. The first end 104.1 is configured to receive and be electrically coupled to the inner conductor 201.4 of the coaxial cable 201, and the inner conductor 201.4 may be suitable shaped, trimmed, chamfered, etc., to facilitate this coupling via a crimping mechanism, soldering, etc. This relationship between the first end 104.1 of the clamp 104 and the inner conductor 201.4 is illustrated in further detail in the views as shown in FIGS. 1B and 1G. The second end 104.2 is configured to receive and be electrically coupled to the center pin of the center pin terminal 600.3 of the coaxial receptacle 600 as discussed herein.

In this way, the clamp 104 functions to transfer signals between the center pin terminal 600.3 of the coaxial receptacle 600 and the inner conductor 201.4 of the coaxial cable 201. To do so, the clamp 104 comprises, at the second end 104.2, two arms 104.3, 104.4, which function to provide a clamping mechanism with respect to the center pin identified with the center pin terminal 600.3 of the coaxial receptacle 600. When mated with the coaxial receptacle 600 as discussed herein, the two arms 104.3, 104.4 are symmetrically disposed about the center pin of the center pin terminal 600.3. Thus, the clamp 104 is shaped at the first end 104.1 so as to provide electrical contact with the inner conductor 201.4 and, when mated with the coaxial receptacle 600, the clamp 104 is shaped at the second end 104.2 to also provide electrical contact with the center pin terminal 600.3 via contact with the center pin.

The two arms 104.3, 104.4 as shown in FIG. 4 are illustrated in a non-limiting sense, and the clamp 104 may be of any suitable size and shape to accommodate the size and/or type of the inner conductor 201.4 and the center pin of the center pin terminal 600.3. In any event, in this configuration, the arms 104.3, 104.4 of the clamp 104 are biased at the second end 104.2 with respect to the diameter of the center pin of the center pin terminal 600.3 to provide a clamping force onto the center pin when the coaxial cable connector 110 is mated with the coaxial receptacle 600. This is shown in greater detail in FIG. 1F, which also illustrated the relationship between the clamp 104 and the center pin of the center pin terminal 600.3. As shown in FIG. 1F, the clamp 104 at the second end 104.2 is disposed on the top of (i.e. flush with) the center pin, although the clamping force provided by the arms 104.3, 104.4 is applied at opposing sides of the center pin. Thus, and as shown in further detail in FIGS. 1B and 1F, the clamp 104 extends laterally in a plane that is flush with the top of the center pin of the center pin terminal 600.3 when the coaxial cable connector 110 is mated with the coaxial receptacle 600.

Thus, when the cable connector 110 is mated with the coaxial receptacle 600, it ensured that the arms 104.3, 104.4 at the second end 104.2 of the clamp 104 electrically contact two opposite sides of the center pin of the center pin terminal 600.3. That is, the biased nature of the arms 104.3, 104.4 at the second end 104.2 of the clamp 104 causes the two arms 104.3, 104.4 to provide a clamping force on two opposing sides of the center pin 600.3 when the coaxial cable connector 110 is mated with the coaxial receptacle 600. Moreover, and as shown in FIG. 4, the two arms 104.3, 104.4 may be symmetrically disposed about an axis that is aligned with the inner conductor 201.4 as the inner conductor is received into the first end 104.1 of the clamp 104. In this way, the clamp 104 is configured to laterally couple the inner conductor 201.4 to the center pin of the center pin terminal 600.3 via an opening in the ground ring of the coaxial receptacle 600, as further discussed herein.

It is noted that the coaxial cable connector 110 implements a right angle or substantially (excepting for tolerances) 90-degree connection with the coaxial receptacle 600 via the use of the lateral coupling of the clamp 104, which is coupled to the inner conductor 201.4 and to the sides of the center pin of the center pin terminal 600.3 when the coaxial cable connector 110 is mated with the coaxial receptacle 600. In other words, the hole 102.2 of the insert 102 is configured to receive the center pin 600.3, which extends in one direction (such as the z-direction), and the clamp 104 is configured to receive the inner conductor 201.4, which extends in another direction (such as a direction within the x-y plane) into the first end 104.1. In this configuration, and due to the lateral coupling of the inner conductor 201.4 and the center pin of the center pin terminal 600.3 with the clamp 104 as discussed herein, these two directions may be perpendicular to one another.

It is noted that this configuration is in contrast to conventional right-angle coaxial cable connectors, which implement a connection from the inner conductor to the top of a mating coaxial receptacle center pin. That is, conventional 90-degree coaxial connectors mate with a coaxial receptacle center pin by coupling with the center pin from a "top" direction with respect to the direction of extension of the center pin. This conventional configuration requires that the inner conductor be routed above the coaxial receptacle, i.e. bent 90-degrees to extend downward from above to couple with the mating coaxial receptacle center pin. The bending of the inner conductor in this manner results in a higher profile of the coaxial cable connector. The coaxial cable connector 110 as disclosed herein nullifies such disadvantages by obviating the need for such "overhead" cable routing via the implementation of the lateral coupling mechanism provided by the clamp 104. This lateral coupling mechanism functions to establish electrical contact with the inner conductor 201.4, as well as the center pin of the center pin terminal 600.3 by providing a clamping force on two opposing sides of the center pin of the center pin terminal 600.3 when the coaxial cable connector 110 is mated with the coaxial receptacle 600.

The use of the lateral coupled clamp 104 as discussed herein thus facilitates an ultra-low profile mated height of the coaxial cable connector 110 and the coaxial receptacle 600. The details of the mated height specifications that may be achieved with respect to the mated coaxial cable connector 110 and coaxial receptacle 600 are further discussed below. However, to ensure that a thinner communication module height may be retained for larger coaxial cables (such as 1.13 mm diameter coaxial cables), it is noted that the use of the lateral coupled inner conductor 201.4 with the clamp 104 may result in a further modification to how such coaxial cables may be routed with respect to the coaxial cable connector 110.

That is, and referring now to FIG. 2A as one non-limiting scenario, the outer three layers (i.e. the outer jacket 201.1, the outer conductor 201.2, and the dielectric core 201.3 may be lowered or offset from the inner conductor 201.4. Thus, the coaxial cable connector 110 may connect the edge of a communication module board, and a portion of the profile of the coaxial cable 201 may extend beneath the communication module board to reduce overall communication module height. For the use of the 1.13 mm diameter coaxial cable 201 as shown in FIG. 2A, this may include an offset of the inner conductor 201.4 by 0.175 mm, which may be achieved by forming any suitable angle (such as the 45 degree angle as shown in FIG. 2A) between the original axis of the inner conductor 201.4 and the offset axis of the inner conductor as received into the first end 104.1 of the clamp 104 as discussed herein. With this in mind, the axis of the inner conductor 201.4 as shown in FIG. 4 that is aligned with the end 104.1 of the clamp 104, which receives the inner conductor 201.4, may be with respect to either the original axis of the inner conductor 201.4 (such as shown for the smaller 0.81 mm diameter coaxial cable in FIG. 2B), or with respect to the offset axis of the inner conductor 201.4, as the case may be.

Again, the coaxial cable connector 110 includes an outer shell 106. Turning now to FIGS. 5A-5B, additional details with respect to the outer shell 106 are shown. The outer shell 106 may be comprised of a single piece of metal and/or be implemented as any suitable type of electrically-conductive material to form an electrically-conductive shell. As shown in further detail in FIG. 5B, the outer shell 106 includes a mating portion or end 106.1, which is configured to receive the insert 102 as noted above and is identified with a portion of the outer shell 106 that mates with the coaxial receptacle 600 as discussed herein. The outer shell 106 further includes a cable connecting portion or end 106.2, which is shaped to receive the outer conductor 201.2 of the coaxial cable 201 as shown in FIGS. 1A-1G. Thus, the outer shell 106 is configured to be crimped around the outer conductor 201.2 at any suitable number of locations such that the outer conductor 201.2 is electrically coupled to the entirety of the outer shell 106.

The outer shell 106 further includes a cutout or opening 106.3 in the mating portion 106.1. The cutout 106.3 may be any suitable shape and/or dimension that matches or aligns with (excepting for tolerances) the opening in the ground ring of the ground terminal 600.2 of the coaxial receptacle 600 when mated therewith, as discussed herein and in further detail below with respect to FIGS. 6A-6B. In this way, the cutout 106.3 allows the height of the center pin of the center pin terminal 600.3 to be moved downward (i.e. reduced in height) to achieve the low profile connector height as discussed herein. The connection mechanism between the outer shell 106 and the coaxial receptacle 600 may be identified with any suitable type of crimp-style or other suitable style of connector for use with the coaxial cable 201 that is configured to mate with the coaxial receptacle 600. That is, the outer shell 106 may be identified with an outer metal shell that is used to crimp coaxial cable connectors to the coaxial cable 201. Thus, the mating portion 106.1 of the outer shell 106 may enable the coaxial cable connector 110 to have a "snap fit" feature with the coaxial receptacle 600, which may be implemented in accordance with any suitable designs, including known snap-fit designs from coaxial connectors and mating coaxial receptacles. Such snap fit connections are known among coaxial cable connector and receptacle designs, and thus additional details of this snap fit connection between the coaxial cable connector 110 and the coaxial receptacle 600, which is enabled by way of the mating portion 106.1 of the outer shell 106, are not disclosed further herein for purposes of brevity.

The coaxial receptacle 600 is shown in further detail in FIGS. 6A and 6B. The coaxial receptacle 600 may be a surface-mounted (i.e. PCB mounted) receptacle that includes a spacer 600.1, a ground terminal 600.2, and a center pin terminal 600.3. Each of the spacer 600.1, the ground terminal 600.2, and the center pin terminal 600.3 is configured to mechanically couple to one another to form a "stack" such that the coaxial receptacle 600 is realized as shown in FIGS. 6A-6B. This coupling may be achieved in any suitable manner, such as via mechanical couplings, adhesives, etc. The spacer 600.1 may be comprised of any suitable type of electrically-insulating material such as plastic or another suitable polymer, a dielectric material, etc. The ground terminal 600.2 and the center pin terminal 600.3 may be comprised of metal or other suitable electrically-conductive material.

Although three ground tabs are shown in FIGS. 6A and 6B, the ground terminal 600.2 may include any suitable number of ground tabs that may be soldered to the communication module (not shown), onto which the coaxial receptacle 600 is mounted. Thus, when the coaxial cable connector 110 is mated to the coaxial receptacle 600, the ground tabs function to electrically couple corresponding grounded communication module components to both the ground ring of the ground terminal 600.2 and to the outer conductor 201.2 of the coaxial cable 201. Furthermore, the center pin terminal 600.3 includes the center pin that extends perpendicularly with respect to the mounted plane of the coaxial receptacle 600, and which is coupled to the second end 104.2 of the clamp 104 when the coaxial cable connector 110 is mated to the coaxial receptacle 600 as noted herein. The center pin terminal 600.3 may also include any suitable number of center pin tabs, with one being shown in FIG. 6A in a non-limiting manner. The center pin tab of the center pin terminal 600.3 may be soldered to the communication module board and be coupled to any suitable number and/or type of communication components. Thus, when the coaxial cable connector 110 is mated with the coaxial receptacle 600, the center pin tab functions to electrically couple correspondingly-coupled communication module components to both the center pin of the center pin terminal 600.3 and to the inner conductor 201.4 of the coaxial cable 201. The ground terminal 600.2 may also include a ground ring that is configured to electrically couple to the outer shell 106 as discussed herein, and which may form a snap fit together.

The coaxial receptacle 600 may be of any suitable footprint, size, and/or shape to mate with the coaxial cable connector 110 as discussed herein. In one non-limiting scenario, the coaxial receptacle 600 has footprint dimensions identified with an M.2 plug-compatible Radio Frequency Coaxial Connector (RFCC). The footprint dimensions of the coaxial receptacle 600 may be same or substantially similar to (i.e. excepting for tolerances) to a conventional RFCC receptacle as shown in FIG. 6C.

Figure 6C:
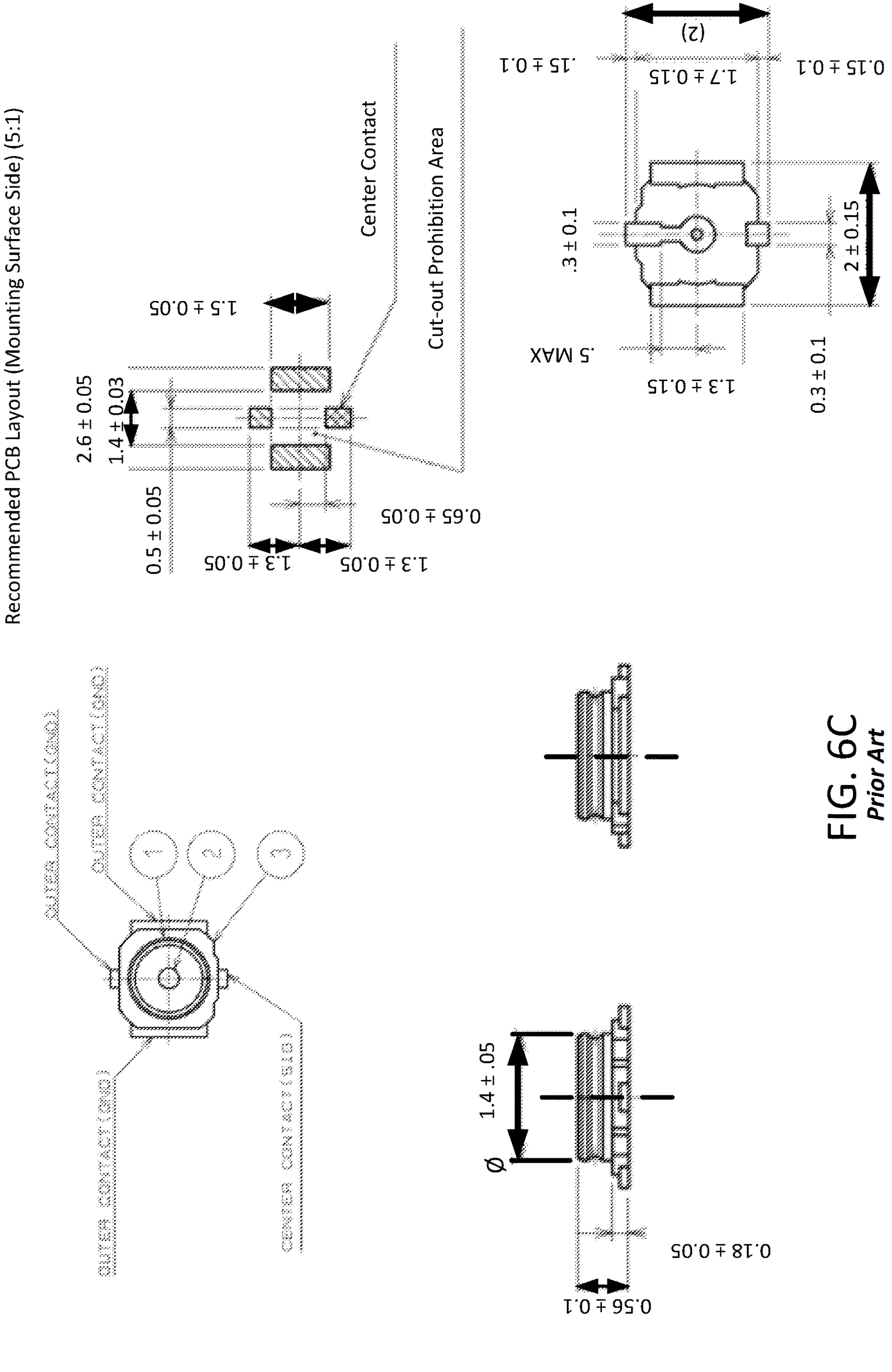
FIG. 6C Prior Art
FIG. 6C illustrates a footprint and associated dimensions of a conventional coaxial receptacle.

However, although the footprint dimensions of the coaxial receptacle 600 may be the same as a conventional RFCC receptacle, the lateral coupling of the inner conductor 201.4 and the central pin, which is facilitated by the clamp 104 as discussed herein, results in modifications to the RFCC receptacle as shown in FIG. 6C. That is, the conventional RFCC receptacle as shown in FIG. 6C uses a 360 degree ground ring and allows for rotation (i.e. swiveling) of the coaxial cable connector once mated therewith. However, because the center pin of the center pin terminal 600.3 is laterally coupled to the inner conductor 201.4 of the coaxial cable connector 110 to reduce the mated height, the ground ring is opened as shown in FIGS. 6A-6B to accommodate receiving the inner conductor 201.4 of the coaxial cable connector 110 in this direction. In other words, when the coaxial cable connector 110 is mated with the coaxial receptacle 600, the inner conductor 201.4, which is coupled to the first end 104.1 of the clamp 104 as noted herein, passes through the opening in the ground ring. Thus, the cutout or opening in the ground ring enables the coaxial cable inner conductor 201.4 to directly couple or access the center pin of the center pin terminal 600.3 via the clamp 104. Again, this cutout or opening in the ground ring mates with a corresponding cutout 106.3 in the outer shell 106. FIGS. 1B and 1G further illustrate the details of the opening in the ground ring of the coaxial receptacle when mated with the coaxial cable connector 600 in this way. As shown in FIG. 1B, the clamp 104 passes through the opening in the ground ring of the ground terminal 600.2 to facilitate the lateral coupling of the inner conductor 201.4 to the center pin of the center pin terminal 600.3 as noted herein.

The opening in the ground ring may be of any suitable size that may be expressed as an angle of an arc that is swept out by the opening. The opening of the ground ring as shown in FIGS. 6A-6B is 90 degrees as a non-limiting scenario. The opening in the ground ring may be smaller than a 90 degree arc, although the opening should be adequately sized such that the clamp 104 may fit within this opening with a suitable amount of clearance acknowledging tolerances. Moreover, although the opening of the ground ring may be larger, this will cause the connection between the outer shell 106 and the coaxial receptacle 600 to be less secure. Thus, a ground ring opening of 90 degrees represents an adequate trade-off.

Figure 7:
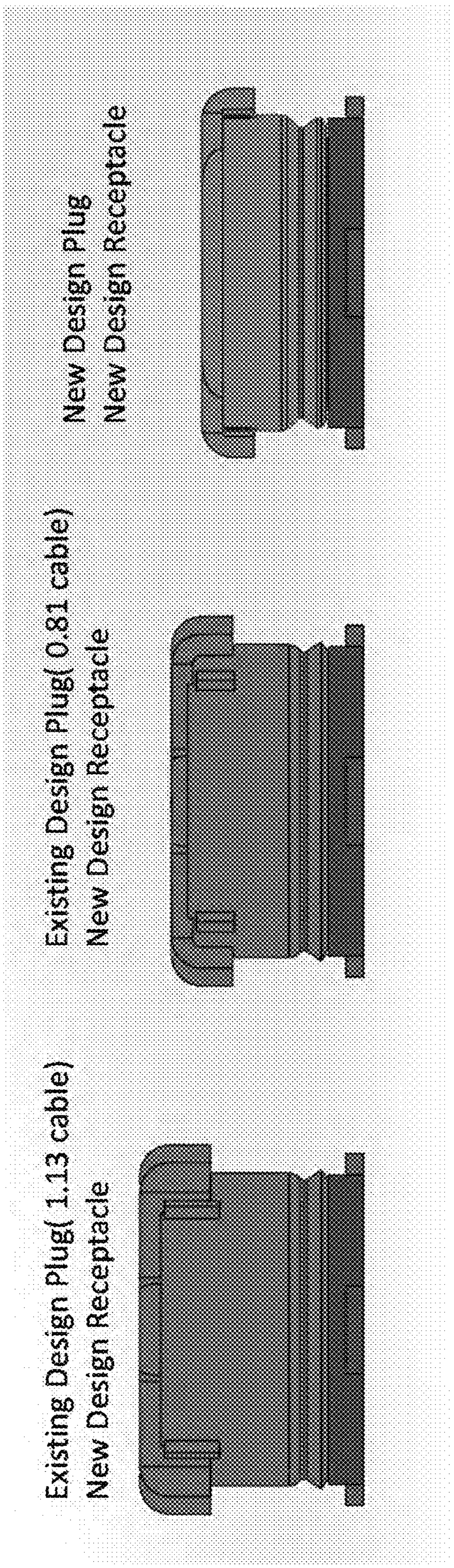
FIG. 7 illustrates compatibility of the coaxial receptacle as shown in FIGS. 6A-6B with industry compliant plugs.

Thus, the use of the ground ring opening and the lateral coupling of the center pin to the clamp 104 results in an inability to freely rotate the coaxial cable connector 110 once mated with the coaxial receptacle 600. However, this lack of rotation is acceptable given the higher priority of significantly reducing the mated height of the coaxial cable connector 110. As shown in FIG. 7, the coaxial receptacle 600 is also backward-compatible with conventional micro coaxial cable connectors (such as those that would mate with the conventional RFCC receptacle as shown in FIG. 6C), and does allow for a full 360-degree rotation of the mated coaxial cable connector in this instance. That is, because a standard coaxial cable connector does not include the matching cutout 106.3 as shown in FIG. 5B, a standard coaxial cable connector does not laterally couple the inner conductor of the coaxial able to the center pin of the coaxial receptacle 600 as discussed herein. As a result, the use of conventional coaxial cable connectors with the coaxial receptacle 600 does not provide the ultra-low mated height benefits as discussed herein with respect to the LPRFCC. The advantage of using both the coaxial cable connector 110 and the coaxial receptacle 600 as discussed herein is demonstrated by comparing the different combinations as shown in FIG. 7.

Figure 8:
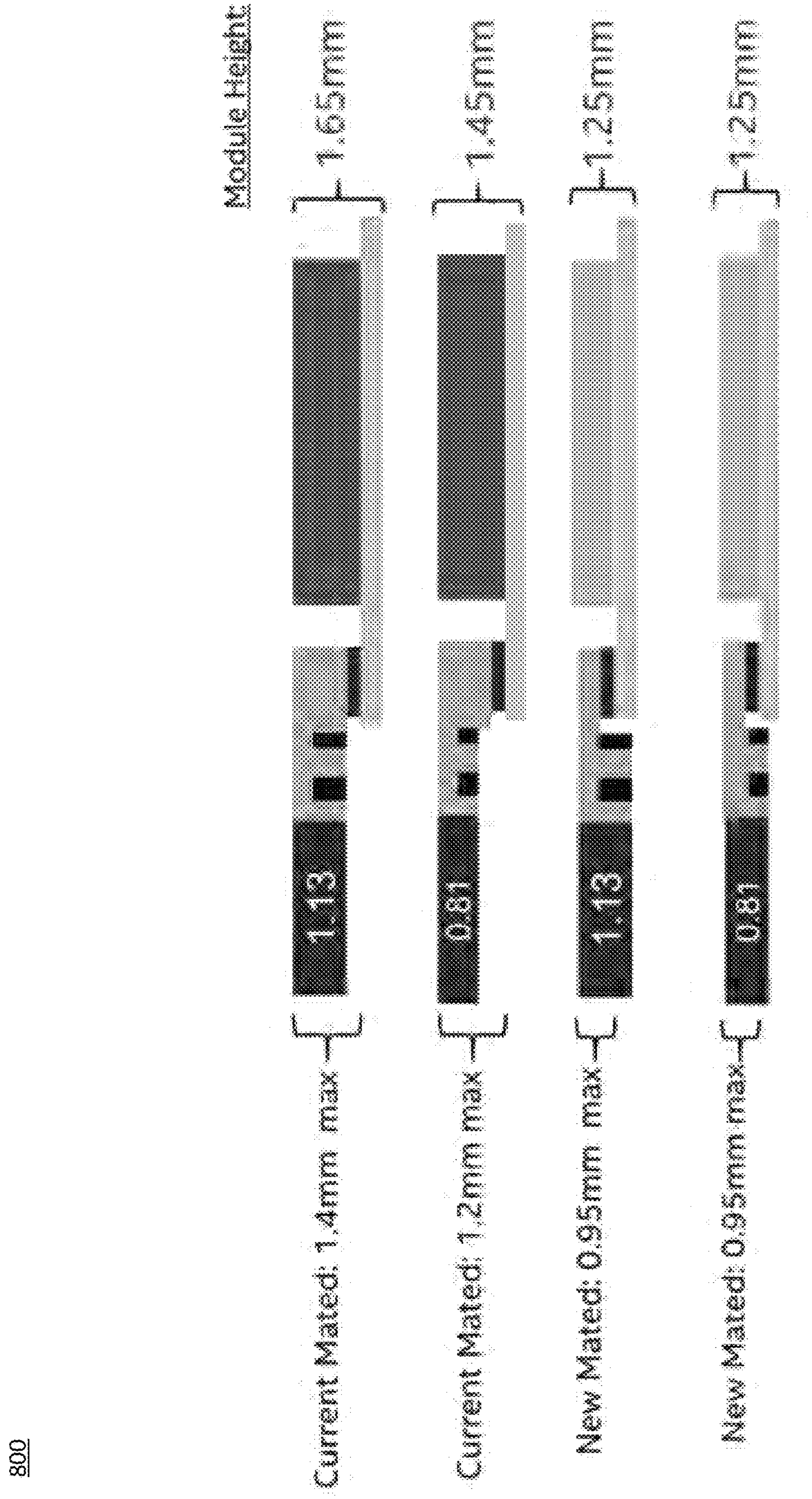
FIG. 8 illustrates a graphical representation showing a comparison of mated and module heights for conventional coaxial connector and receptacle mating designs compared to the coaxial connector and mating receptacle in accordance with the disclosure.

FIG. 8 illustrates a graphical representation showing a comparison of mated and module heights for conventional coaxial connector and receptacle mating designs compared to the coaxial connector and mating receptacle in accordance with the disclosure. The two bottom side views as shown in FIG. 8 may be identified with the coaxial cable connector 110 being mated with a coaxial receptacle 600 that is mounted onto a communication module board as discussed herein. The mated height of the coaxial cable connector 110 when coupled to the coaxial receptacle 600 is a maximum of 0.95 millimeters (mm), which is the case for both the 1.13 mm and the 0.81 mm diameter coaxial cable. The mated height in this context may be measured from the bottom of the coaxial receptacle 600 to the top of the outer shell 106.

When the coaxial cable connector 110 is mated with the coaxial receptacle 600 in this manner, the maximum above the board height is 0.950 mm, which again is measured from the bottom of the coaxial receptacle 600 to the top of the outer shell 106. Furthermore, the maximum below the board height is 0.200 mm, which is the result of the offset of the inner conductor 201.4 as noted herein, and is measured from the bottom of the coaxial receptacle 600 to the bottom of the outer jacket 201.1 of the coaxial cable 201. This maximum below the board height is provided for the use of a 1.13 mm diameter coaxial cable, and would be less for the smaller diameter 0.81 mm coaxial cable.

As shown in further detail in FIG. 8, conventional coaxial cable connectors result in a maximum mated height of 1.4 mm and 1.2 mm, respectively, for 1.13 mm and 0.81 mm diameter coaxial cables. By further considering the board thickness and other minimum spacing requirements, the height of a corresponding communication module is 1.65 mm and 1.45 mm, respectively, for 1.13 mm and 0.81 mm diameter coaxial cables. In contrast, the LPRFCC as discussed herein, which again includes the coaxial cable connector 110 when mated with the coaxial receptacle 600, results in a maximum mated height of 0.95 mm in either case. In other words, the LPRFCC as discussed herein is configured to provide an advantageous reduction in overall height for both 1.13 mm and 0.81 mm diameter coaxial cables, although the LPRFCC as discussed herein is not limited to only these specific coaxial cables. And because the coaxial cable 201 may extend beneath the upper edge of the communication module board in either case, the thickness of the board advantageously does not contribute as significantly to the additional height with respect to the resulting communication module height. This enables the coaxial cable connector 110 and the mating coaxial receptacle 600 to facilitate communication module designs having a reduced maximum thickness or height of 1.25 mm for both 1.13 mm and 0.81 mm diameter coaxial cables, as shown in FIG. 8.

General Configuration of a Coaxial Cable Connector

A coaxial cable connector is provided. With reference to FIGS. 1A-1G, 3A-3B, 4, and 5A-5B, the coaxial cable connector includes a clamp having a first end and a second end, the clamp being configured to electrically contact an inner conductor of a coaxial cable at the first end, and an electrically-insulating insert having (i) a slot configured to receive the clamp, and (ii) an opening configured to receive a center pin of a coaxial receptacle that is configured to mate with the coaxial cable connector, wherein the second end of the clamp is configured to electrically contact two sides of the center pin of the coaxial receptacle. The clamp is comprised of a single piece of electrically conductive material. In addition or in alternative to and in any combination with the optional features previously explained in this paragraph, the slot in the electrically-insulating insert captivates the clamp. In addition or in alternative to and in any combination with the optional features previously explained in this paragraph, the clamp comprises two arms that are symmetrically disposed about an axis that is aligned with the inner conductor of the coaxial cable when the inner conductor is received into the first end of the clamp. In addition or in alternative to and in any combination with the optional features previously explained in this paragraph, the first end of the clamp is configured to electrically contact the inner conductor. In addition or in alternative to and in any combination with the optional features previously explained in this paragraph, the second end of the clamp is configured to electrically contact the two sides of the center pin of the coaxial receptacle by providing a clamping force on two opposite sides of the center pin when the coaxial cable connector is mated with the coaxial receptacle. In addition or in alternative to and in any combination with the optional features previously explained in this paragraph, the clamp extends laterally in a plane that is flush with a top of the center pin when the coaxial cable connector is mated with the coaxial receptacle. In addition or in alternative to and in any combination with the optional features previously explained in this paragraph, the opening in the electrically-insulating insert is configured to receive the center pin of the coaxial receptacle that extends in a first direction, the clamp is configured to receive the inner conductor into the first end of the clamp, the inner conductor extending in a second direction, and the first direction and the second direction are perpendicular to one another. In addition or in alternative to and in any combination with the optional features previously explained in this paragraph, the coaxial cable connector further includes an outer metal shell configured to electrically contact an outer conductor of the coaxial cable, wherein the electrically-insulating insert is disposed in the outer metal shell. In addition or in alternative to and in any combination with the optional features previously explained in this paragraph, the coaxial receptacle comprises a ground ring having an opening through which the clamp is received when the coaxial cable connector is mated with the coaxial receptacle. In addition or in alternative to and in any combination with the optional features previously explained in this paragraph, the coaxial cable connector further includes an outer metal shell configured to electrically contact an outer conductor of the coaxial cable, wherein the outer metal shell includes an opening that aligns with the opening in the ground ring of the coaxial receptacle when the coaxial cable connector is mated with the coaxial receptacle. In addition or in alternative to and in any combination with the optional features previously explained in this paragraph, the opening in the ground ring corresponds to a 90 degree arc. In addition or in alternative to and in any combination with the optional features previously explained in this paragraph, a combined mated height of the coaxial cable connector when coupled to the coaxial receptacle is a maximum of 0.95 millimeters (mm). In addition or in alternative to and in any combination with the optional features previously explained in this paragraph, the coaxial cable has an outer diameter of 1.13 mm. In addition or in alternative to and in any combination with the optional features previously explained in this paragraph, the coaxial cable has an outer diameter of 0.81 mm.

General Configuration of a Coaxial Receptacle

A coaxial receptacle is provided. With reference to FIGS. 1A-1G and 6A-6B, the coaxial receptacle includes an electrically-insulating substrate, a ground terminal, and a center pin terminal, wherein the ground terminal comprises a ground ring having an opening through which a clamp is received when a coaxial cable connector is mated with the coaxial receptacle, and wherein the clamp couples an inner conductor of the coaxial cable to a center pin of the center pin terminal. The opening in the ground ring corresponds to a 90 degree arc. In addition or in alternative to and in any combination with the optional features previously explained in this paragraph, the coaxial cable connector comprises an outer metal shell configured to electrically contact an outer conductor of the coaxial cable to the ground terminal. In addition or in alternative to and in any combination with the optional features previously explained in this paragraph, the outer metal shell includes an opening that aligns with the opening in the ground ring of the coaxial receptacle when the coaxial cable connector is mated with the coaxial receptacle. In addition or in alternative to and in any combination with the optional features previously explained in this paragraph, a combined mated height of the coaxial cable connector when coupled to the coaxial receptacle is a maximum of 0.95 millimeters (mm).

EXAMPLES

The following examples pertain to various techniques of the present disclosure.

An example (e.g. example 1) relates to a coaxial cable connector. The coaxial cable connector includes a clamp having a first end and a second end, the clamp being configured to electrically contact an inner conductor of a coaxial cable at the first end, and an electrically-insulating insert having (i) a slot configured to receive the clamp, and (ii) an opening configured to receive a center pin of a coaxial receptacle that is configured to mate with the coaxial cable connector, wherein the second end of the clamp is configured to electrically contact two sides of the center pin of the coaxial receptacle.

Another example (e.g. example 2) relates to a previously-described example (e.g. example 1), wherein the clamp is comprised of a single piece of electrically conductive material.

Another example (e.g. example 3) relates to a previously-described example (e.g. one or more of examples 1-2), wherein the slot in the electrically-insulating insert captivates the clamp.

Another example (e.g. example 4) relates to a previously-described example (e.g. one or more of examples 1-3), wherein the clamp comprises two arms that are symmetrically disposed about an axis that is aligned with the inner conductor of the coaxial cable when the inner conductor is received into the first end of the clamp.

Another example (e.g. example 5) relates to a previously-described example (e.g. one or more of examples 1-4), wherein the first end of the clamp is configured to electrically contact the inner conductor.

Another example (e.g. example 6) relates to a previously-described example (e.g. one or more of examples 1-5), wherein the second end of the clamp is configured to electrically contact the two sides of the center pin of the coaxial receptacle by providing a clamping force on two opposite sides of the center pin when the coaxial cable connector is mated with the coaxial receptacle.

Another example (e.g. example 7) relates to a previously-described example (e.g. one or more of examples 1-6), wherein the clamp extends laterally in a plane that is flush with a top of the center pin when the coaxial cable connector is mated with the coaxial receptacle.

Another example (e.g. example 8) relates to a previously-described example (e.g. one or more of examples 1-7), wherein: the opening in the electrically-insulating insert is configured to receive the center pin of the coaxial receptacle that extends in a first direction, the clamp is configured to receive the inner conductor into the first end of the clamp, the inner conductor extending in a second direction, and the first direction and the second direction are perpendicular to one another.

Another example (e.g. example 9) relates to a previously-described example (e.g. one or more of examples 1-8), further comprising: an outer metal shell configured to electrically contact an outer conductor of the coaxial cable, wherein the electrically-insulating insert is disposed in the outer metal shell.

Another example (e.g. example 10) relates to a previously-described example (e.g. one or more of examples 1-9), wherein the coaxial receptacle comprises a ground ring having an opening through which the clamp is received when the coaxial cable connector is mated with the coaxial receptacle.

Another example (e.g. example 11) relates to a previously-described example (e.g. one or more of examples 1-10), further comprising: an outer metal shell configured to electrically contact an outer conductor of the coaxial cable, wherein the outer metal shell includes an opening that aligns with the opening in the ground ring of the coaxial receptacle when the coaxial cable connector is mated with the coaxial receptacle.

Another example (e.g. example 12) relates to a previously-described example (e.g. one or more of examples 1-11), wherein the opening in the ground ring corresponds to a 90 degree arc.

Another example (e.g. example 13) relates to a previously-described example (e.g. one or more of examples 1-12), wherein a combined mated height of the coaxial cable connector when coupled to the coaxial receptacle is a maximum of 0.95 millimeters (mm).

Another example (e.g. example 14) relates to a previously-described example (e.g. one or more of examples 1-13), wherein the coaxial cable has an outer diameter of 1.13 mm.

Another example (e.g. example 15) relates to a previously-described example (e.g. one or more of examples 1-14), wherein the coaxial cable has an outer diameter of 0.81 mm.

An example (e.g. example 16) relates to a coaxial receptacle. The coaxial receptacle includes an electrically-insulating substrate, a ground terminal, and a center pin terminal, wherein the ground terminal comprises a ground ring having an opening through which a clamp is received when a coaxial cable connector is mated with the coaxial receptacle, and wherein the clamp couples an inner conductor of the coaxial cable to a center pin of the center pin terminal.

Another example (e.g. example 17) relates to a previously-described example (e.g. example 16), wherein the opening in the ground ring corresponds to a 90 degree arc.

Another example (e.g. example 18) relates to a previously-described example (e.g. one or more of examples 16-17), wherein the coaxial cable connector comprises an outer metal shell configured to electrically contact an outer conductor of the coaxial cable to the ground terminal.

Another example (e.g. example 19) relates to a previously-described example (e.g. one or more of examples 16-18), wherein the outer metal shell includes an opening that aligns with the opening in the ground ring of the coaxial receptacle when the coaxial cable connector is mated with the coaxial receptacle.

Another example (e.g. example 20) relates to a previously-described example (e.g. one or more of examples 16-19), wherein a combined mated height of the coaxial cable connector when coupled to the coaxial receptacle is a maximum of 0.95 millimeters (mm).

An example (e.g. example 21) relates to a coaxial cable connector means. The coaxial cable connector means includes a clamping means having a first end and a second end, the clamping means being configured to electrically contact an inner conductor of a coaxial cable at the first end, and an electrically-insulating insert means having (i) a slot configured to receive the clamping means, and (ii) an opening configured to receive a center pin of a coaxial receptacle means that is configured to mate with the coaxial cable connector means, wherein the second end of the clamping means is configured to electrically contact two sides of the center pin of the coaxial receptacle.

Another example (e.g. example 22) relates to a previously-described example (e.g. example 21), wherein the clamping means is comprised of a single piece of electrically conductive material.

Another example (e.g. example 23) relates to a previously-described example (e.g. one or more of examples 21-22), wherein the slot in the electrically-insulating insert captivates the clamping means.

Another example (e.g. example 24) relates to a previously-described example (e.g. one or more of examples 21-23), wherein the clamping means comprises two arms that are symmetrically disposed about an axis that is aligned with the inner conductor of the coaxial cable when the inner conductor is received into the first end of the clamping means.

Another example (e.g. example 25) relates to a previously-described example (e.g. one or more of examples 21-24), wherein the first end of the clamping means is configured to electrically contact the inner conductor.

Another example (e.g. example 26) relates to a previously-described example (e.g. one or more of examples 21-25), wherein the second end of the clamping means is configured to electrically contact the two sides of the center pin of the coaxial receptacle means by providing a clamping force on two opposite sides of the center pin when the coaxial cable connector is mated with the coaxial receptacle.

Another example (e.g. example 27) relates to a previously-described example (e.g. one or more of examples 21-26), wherein the clamping means extends laterally in a plane that is flush with a top of the center pin when the coaxial cable connector is mated with the coaxial receptacle.

Another example (e.g. example 28) relates to a previously-described example (e.g. one or more of examples 21-27), wherein: the opening in the electrically-insulating insert is configured to receive the center pin of the coaxial receptacle means that extends in a first direction, the clamping means being configured to receive the inner conductor into the first end of the clamping means, the inner conductor extending in a second direction, and the first direction and the second direction are perpendicular to one another.

Another example (e.g. example 29) relates to a previously-described example (e.g. one or more of examples 21-28), further comprising: an outer metal shell configured to electrically contact an outer conductor of the coaxial cable, wherein the electrically-insulating insert is disposed in the outer metal shell.

Another example (e.g. example 30) relates to a previously-described example (e.g. one or more of examples 21-29), wherein the coaxial receptacle means comprises a grounding means having an opening through which the clamp is received when the coaxial cable connector means is mated with the coaxial receptacle.

Another example (e.g. example 31) relates to a previously-described example (e.g. one or more of examples 21-30), further comprising: an outer metal shell configured to electrically contact an outer conductor of the coaxial cable, wherein the outer metal shell includes an opening that aligns with the opening in the grounding means of the coaxial receptacle means when the coaxial cable connector means is mated with the coaxial receptacle.

Another example (e.g. example 32) relates to a previously-described example (e.g. one or more of examples 21-31), wherein the opening in the grounding means corresponds to a 90 degree arc.

Another example (e.g. example 33) relates to a previously-described example (e.g. one or more of examples 21-32), wherein a combined mated height of the coaxial cable connector means when coupled to the coaxial receptacle means is a maximum of 0.95 millimeters (mm).

Another example (e.g. example 34) relates to a previously-described example (e.g. one or more of examples 21-33), wherein the coaxial cable has an outer diameter of 1.13 mm.

Another example (e.g. example 35) relates to a previously-described example (e.g. one or more of examples 21-34), wherein the coaxial cable has an outer diameter of 0.81 mm.

An example (e.g. example 36) relates to a coaxial receptacle means. The coaxial receptacle means includes an electrically-insulating substrate means, a grounding means, and a center pin terminal means, wherein the grounding means comprises a ground ring having an opening through which a clamping means is received when a coaxial cable connector means is mated with the coaxial receptacle, and wherein the clamping means couples an inner conductor of the coaxial cable to a center pin of the center pin terminal.

Another example (e.g. example 37) relates to a previously-described example (e.g. example 36), wherein the opening in the ground ring corresponds to a 90 degree arc.

Another example (e.g. example 38) relates to a previously-described example (e.g. one or more of examples 36-37), wherein the coaxial cable connector means comprises an outer metal shell configured to electrically contact an outer conductor of the coaxial cable to the grounding means.

Another example (e.g. example 39) relates to a previously-described example (e.g. one or more of examples 36-38), wherein the outer metal shell includes an opening that aligns with the opening in the ground ring of the coaxial receptacle means when the coaxial cable connector is mated with the coaxial receptacle.

Another example (e.g. example 40) relates to a previously-described example (e.g. one or more of examples 36-39), wherein a combined mated height of the coaxial cable connector means when coupled to the coaxial receptacle means is a maximum of 0.95 millimeters (mm).

An apparatus as shown and described.

A method as shown and described.

CONCLUSION

The aforementioned description will so fully reveal the general nature of the implementation of the disclosure that others can, by applying knowledge within the skill of the art, readily modify and/or adapt for various applications such specific implementations without undue experimentation and without departing from the general concept of the present disclosure. Therefore, such adaptations and modifications are intended to be within the meaning and range of equivalents of the disclosed implementations, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Each implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to affect such feature, structure, or characteristic in connection with other implementations whether or not explicitly described.

The exemplary implementations described herein are provided for illustrative purposes, and are not limiting. Other implementations are possible, and modifications may be made to the exemplary implementations. Therefore, the specification is not meant to limit the disclosure. Rather, the scope of the disclosure is defined only in accordance with the following claims and their equivalents.

Throughout the drawings, it should be noted that like reference numbers are used to depict the same or similar elements, features, and structures, unless otherwise noted.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. The terms "group (of)", "set (of)", "collection (of)", "series (of)", "sequence (of)", "grouping (of)", etc., and the like in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The phrase "at least one of" with regard to a group of elements may be used herein to mean at least one element from the group consisting of the elements. The phrase "at least one of" with regard to a group of elements may be used herein to mean a selection of: one of the listed elements, a plurality of one of the listed elements, a plurality of individual listed elements, or a plurality of a multiple of individual listed elements.

What is claimed is:

1. A coaxial cable connector, comprising:

a clamp having a first end and a second end, the clamp being configured to electrically contact an inner conductor of a coaxial cable at the first end; and an electrically-insulating insert having (i) a slot configured to receive the clamp, and (ii) an opening configured to receive a center pin of a coaxial receptacle that is configured to mate with the coaxial cable connector, wherein the second end of the clamp is configured to electrically contact two sides of the center pin of the coaxial receptacle, and wherein the clamp is configured to extend through an opening in a noncontinuous ground ring of the coaxial receptacle that partially surrounds the center pin of the coaxial receptacle when the coaxial cable connector is mated with the coaxial receptacle.

2. The coaxial cable connector of claim 1, wherein the clamp is comprised of a single piece of electrically conductive material.

3. The coaxial cable connector of claim 1, wherein the slot in the electrically-insulating insert captivates the clamp.

4. The coaxial cable connector of claim 1, wherein the clamp comprises two arms that are symmetrically disposed about an axis that is aligned with the inner conductor of the coaxial cable when the inner conductor is received into the first end of the clamp.

5. The coaxial cable connector of claim 1, wherein the first end of the clamp is configured to electrically contact the inner conductor.

6. The coaxial cable connector of claim 1, wherein the second end of the clamp is configured to electrically contact the two sides of the center pin of the coaxial receptacle by providing a clamping force on two opposite sides of the center pin when the coaxial cable connector is mated with the coaxial receptacle.

7. The coaxial cable connector of claim 1, wherein the clamp extends laterally in a plane that is flush with a top of the center pin when the coaxial cable connector is mated with the coaxial receptacle.

8. The coaxial cable connector of claim 1, wherein:

the opening in the electrically-insulating insert is configured to receive the center pin of the coaxial receptacle that extends in a first direction, the clamp is configured to receive the inner conductor into the first end of the clamp, the inner conductor extending in a second direction, and the first direction and the second direction are perpendicular to one another.

9. The coaxial cable connector of claim 1, further comprising:

an outer metal shell configured to electrically contact an outer conductor of the coaxial cable, wherein the electrically-insulating insert is disposed in the outer metal shell.

10. The coaxial cable connector of claim 1, further comprising:

an outer metal shell configured to electrically contact an outer conductor of the coaxial cable, wherein the outer metal shell includes an opening that aligns with the opening in the noncontinuous ground ring of the coaxial receptacle when the coaxial cable connector is mated with the coaxial receptacle.

11. The coaxial cable of claim 1, wherein a combined mated height of the coaxial cable connector when coupled to the coaxial receptacle is a maximum of 0.95 millimeters (mm).

12. The coaxial cable connector of claim 1, wherein the opening in the noncontinuous ground ring corresponds to a 90 degree arc.

13. The coaxial cable connector of claim 12, wherein the coaxial cable has an outer diameter of 1.13 mm.

14. The coaxial cable connector of claim 12, wherein the coaxial cable has an outer diameter of 0.81 mm.

15. The coaxial cable connector of claim 1, wherein when the coaxial cable connector is mated with the coaxial receptacle, the clamp extends laterally in a plane that is flush with a top of the center pin and is beneath a top of the noncontinuous ground ring.

16. The coaxial cable connector of claim 15, wherein the opening in the noncontinuous ground ring comprises a portion of the noncontinuous ground ring that is removed from a wall of the noncontinuous ground ring.

17. The coaxial cable connector of claim 16, wherein the wall of the noncontinuous ground ring extends in a direction that is orthogonal to the plane of extension of the clamp and in an axial direction of the center pin of the coaxial receptacle.

18. A coaxial receptacle, comprising:

an electrically-insulating substrate;

a ground terminal; and a center pin terminal, wherein the ground terminal comprises a noncontinuous ground ring that partially surrounds the center pin of the coaxial receptacle by way of an opening in the noncontinuous ground ring through which a clamp is received when a coaxial cable connector is mated with the coaxial receptacle, and wherein the clamp couples an inner conductor of the coaxial cable to a center pin of the center pin terminal.

19. The coaxial receptacle of claim 18, wherein a combined mated height of the coaxial cable connector when coupled to the coaxial receptacle is a maximum of 0.95 millimeters (mm).

20. The coaxial receptacle of claim 18, wherein the opening in the noncontinuous ground ring corresponds to a 90 degree arc.

21. The coaxial receptacle of claim 20, wherein the coaxial cable connector comprises an outer metal shell configured to electrically contact an outer conductor of the coaxial cable to the ground terminal.

22. The coaxial receptacle of claim 21, wherein the outer metal shell includes an opening that aligns with the opening in the noncontinuous ground ring of the coaxial receptacle when the coaxial cable connector is mated with the coaxial receptacle.

* * * * *